United States Patent
Mascarenhas et al.

(10) Patent No.: US 9,826,801 B2
(45) Date of Patent: Nov. 28, 2017

(54) MOLD-IN TOUCH FASTENING PRODUCT

(71) Applicant: VELCRO BVBA, Deinze (BE)

(72) Inventors: Karl S. Mascarenhas, Mississauga (CA); Michael Cina, Toronto (CA); Paul Joseph Voigt, Waterdown (CA)

(73) Assignee: Velcro BVBA (BE)

( * ) Notice: Subject to any disclaimer, the term of this patent is extended or adjusted under 35 U.S.C. 154(b) by 0 days.

(21) Appl. No.: 14/972,204

(22) Filed: Dec. 17, 2015

(65) Prior Publication Data

US 2016/0366991 A1 Dec. 22, 2016

Related U.S. Application Data

(63) Continuation of application No. 14/741,706, filed on Jun. 17, 2015.

(51) Int. Cl.
*A44B 18/00* (2006.01)
*B29C 33/16* (2006.01)
*B29C 44/12* (2006.01)

(52) U.S. Cl.
CPC ........ *A44B 18/008* (2013.01); *A44B 18/0061* (2013.01); *A44B 18/0076* (2013.01); *B29C 33/16* (2013.01); *B29C 44/1233* (2013.01); *B29C 44/1261* (2013.01); *B29C 44/1271* (2013.01); *A44B 18/0049* (2013.01); *A44B 18/0065* (2013.01); *A44D 2203/00* (2013.01)

(58) Field of Classification Search
CPC .............. A44B 18/008; A44B 18/0061; A44B 18/0076; A44B 18/0049; A44B 18/0065; B29C 44/1271; B29C 44/1233; B29C 33/16; B29C 44/1261; A44D 2203/00
See application file for complete search history.

(56) References Cited

U.S. PATENT DOCUMENTS

| 4,470,857 A | 9/1984 | Casalou |
| 4,563,380 A | 1/1986 | Black et al. |

(Continued)

FOREIGN PATENT DOCUMENTS

| DE | 3903847 | 8/1990 |
| DE | 19956011 | 6/2001 |

(Continued)

OTHER PUBLICATIONS

Partial International Search for PCT/EP2016/059382 dated Jul. 20, 2016 (9 pages).

(Continued)

*Primary Examiner* — Robert J Sandy
*Assistant Examiner* — Louis Mercado
(74) *Attorney, Agent, or Firm* — Fish & Richardson P.C.

(57) ABSTRACT

A male touch fastener strip includes an elongated base and a field of male fastener elements each having a stem extending from a broad face of the base and a head for engaging fibers. The fastener element stems and broad face of the base together form a unitary mass of resin, such as a resin containing a magnetically attractable substance. Wings extend from respective longitudinal edges of the base and define discrete corrugations extending in a series along the fastener strip and forming corresponding undulations in the rear face of the strip along its longitudinal edges. The corrugated wings can also support a foam gasket.

18 Claims, 16 Drawing Sheets

(56) References Cited

U.S. PATENT DOCUMENTS

| | | |
|---|---|---|
| 4,617,214 A | 10/1986 | Billarant |
| 4,673,542 A | 6/1987 | Wigner et al. |
| 4,693,921 A | 9/1987 | Billarant et al. |
| 4,710,414 A | 12/1987 | Northrup et al. |
| 4,726,975 A | 2/1988 | Hatch |
| 4,784,890 A | 11/1988 | Black |
| 4,802,939 A | 2/1989 | Billarant et al. |
| 4,814,036 A | 3/1989 | Hatch |
| 4,842,916 A | 6/1989 | Ogawa et al. |
| 4,870,725 A | 10/1989 | Dubowik |
| 4,881,997 A | 11/1989 | Hatch |
| 4,931,344 A | 6/1990 | Ogawa et al. |
| 4,933,035 A | 6/1990 | Billarant et al. |
| 5,061,540 A | 10/1991 | Cripps et al. |
| 5,110,649 A | 5/1992 | Morse et al. |
| 5,180,618 A | 1/1993 | Kessler et al. |
| 5,259,905 A | 11/1993 | Gilcreast |
| 5,286,431 A | 2/1994 | Banfield et al. |
| 5,422,156 A | 6/1995 | Billarant |
| 5,500,268 A | 3/1996 | Billarant |
| 5,540,970 A | 7/1996 | Banfield et al. |
| 5,587,183 A | 12/1996 | Clark et al. |
| 5,606,781 A | 3/1997 | Provost et al. |
| 5,614,045 A | 3/1997 | Billarant |
| 5,654,070 A | 8/1997 | Billarant |
| 5,665,449 A | 9/1997 | Billarant |
| 5,688,576 A | 11/1997 | Ohno et al. |
| 5,736,217 A | 4/1998 | Banfield et al. |
| 5,766,385 A | 6/1998 | Pollard et al. |
| 5,766,723 A | 6/1998 | Oborny et al. |
| 5,786,061 A | 7/1998 | Banfield |
| 5,795,640 A | 8/1998 | Billarant |
| 5,840,398 A | 11/1998 | Billarant |
| 5,900,303 A | 5/1999 | Billarant |
| 5,922,436 A | 7/1999 | Banfield et al. |
| 5,932,311 A | 8/1999 | Kenney et al. |
| 5,942,177 A | 8/1999 | Banfield |
| 5,972,465 A | 10/1999 | Ohno et al. |
| 6,129,970 A | 10/2000 | Kenney et al. |
| 6,148,487 A | 11/2000 | Billarant |
| 6,299,954 B1 | 10/2001 | Schulte |
| 6,348,252 B1 | 2/2002 | Kenney et al. |
| 6,460,230 B2 | 10/2002 | Shimamura et al. |
| 6,463,635 B2 | 10/2002 | Murasaki |
| 6,468,624 B1 | 10/2002 | Fujisawa et al. |
| 6,537,643 B1 | 3/2003 | Poulakis |
| 6,540,863 B2 | 4/2003 | Kenney et al. |
| 6,596,371 B1 | 7/2003 | Billarant et al. |
| 6,656,563 B1 | 12/2003 | Leach et al. |
| 6,668,429 B2 | 12/2003 | Fujisawa et al. |
| 6,720,059 B2 | 4/2004 | Fujisawa et al. |
| 6,827,893 B2 | 12/2004 | Clune |
| 6,896,759 B2 | 5/2005 | Fujisawa et al. |
| 7,022,394 B2 | 4/2006 | Fujisawa et al. |
| 7,425,360 B2 | 9/2008 | Line et al. |
| 7,608,070 B2 | 10/2009 | Chen et al. |
| 7,878,785 B2 | 2/2011 | Cathcart et al. |
| 8,795,564 B2 | 8/2014 | Murasaki et al. |
| 9,034,452 B2 | 5/2015 | Cina et al. |
| 9,138,032 B1 | 9/2015 | Cina et al. |
| 2002/0023322 A1 | 2/2002 | Murasaki |
| 2002/0031637 A1 | 3/2002 | Obony et al. |
| 2002/0058123 A1 | 5/2002 | Kenney et al. |
| 2002/0164449 A1 | 11/2002 | Fujisawa et al. |
| 2002/0164451 A1 | 11/2002 | Fujisawa et al. |
| 2003/0099811 A1 | 5/2003 | Poulakis |
| 2003/0134083 A1 | 7/2003 | Wang et al. |
| 2003/0214068 A1 | 11/2003 | Fujisawa et al. |
| 2004/0103503 A1 | 6/2004 | Leach et al. |
| 2004/0108620 A1 | 6/2004 | Leach et al. |
| 2004/0128804 A1 | 7/2004 | Billarant |
| 2005/0060849 A1* | 3/2005 | Vanbenschoten .. A44B 18/0049 24/451 |
| 2005/0160534 A1 | 7/2005 | Akeno et al. |
| 2007/0098953 A1 | 5/2007 | Stabelfeldt et al. |
| 2009/0276986 A1 | 11/2009 | Janzen |
| 2010/0181695 A1 | 7/2010 | Murasaki et al. |
| 2011/0062615 A1 | 3/2011 | Murasaki et al. |
| 2014/0298628 A1* | 10/2014 | Minato .............. A44B 18/0049 24/449 |

FOREIGN PATENT DOCUMENTS

| | | |
|---|---|---|
| EP | 0145603 | 6/1985 |
| EP | 0439969 A1 | 8/1991 |
| EP | 0621118 | 10/1994 |
| EP | 657118 | 6/1995 |
| EP | 0719507 | 7/1996 |
| EP | 2609826 | 7/2013 |
| EP | 2790964 | 10/2014 |
| GB | 2468869 | 9/2010 |
| WO | WO96/25064 | 8/1996 |
| WO | WO 2014/139933 | 9/2014 |

OTHER PUBLICATIONS

International Search Report and Written Opinion in International Application No. PCT/EP2016/059382, dated Nov. 7, 2016, 17 pages.

* cited by examiner

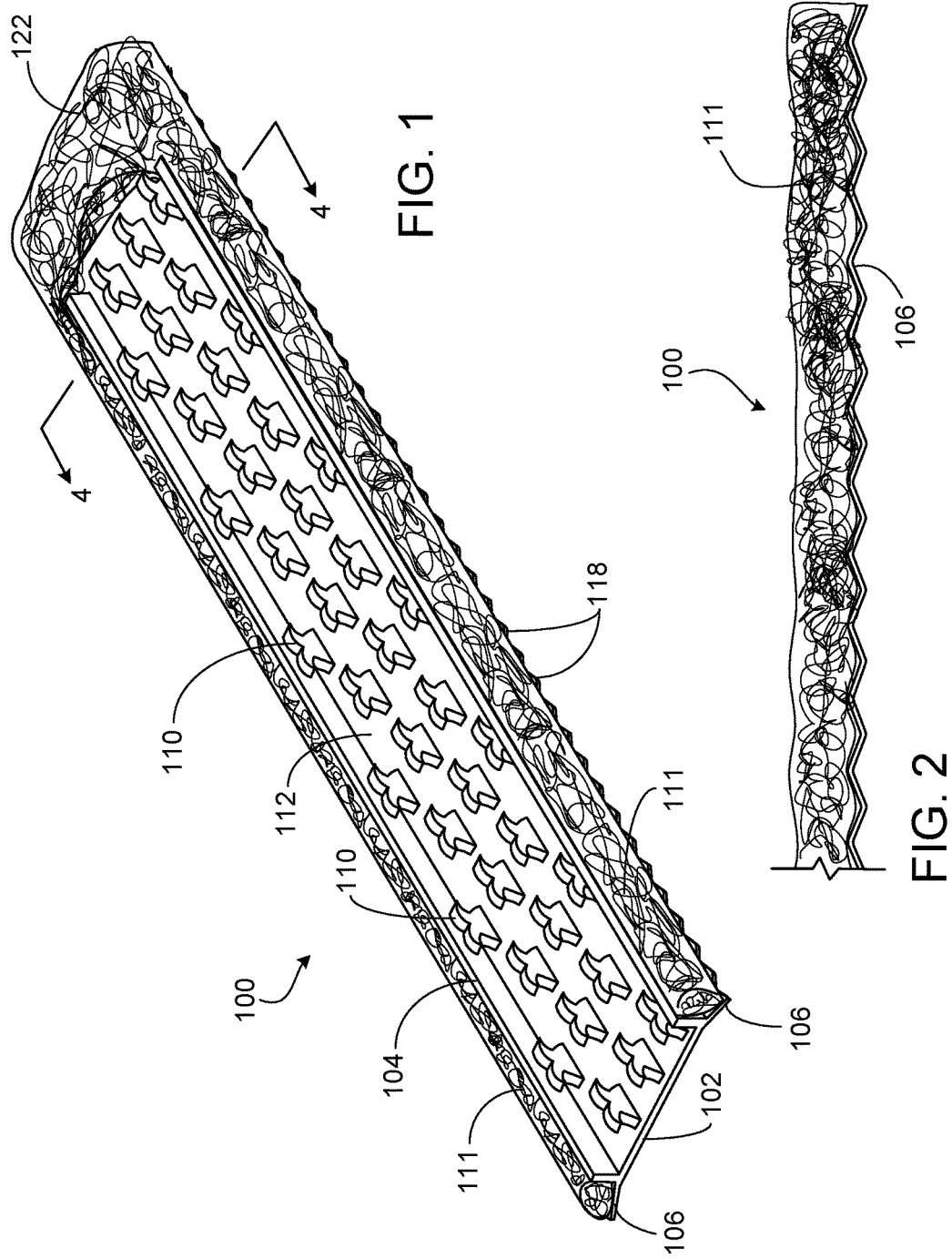

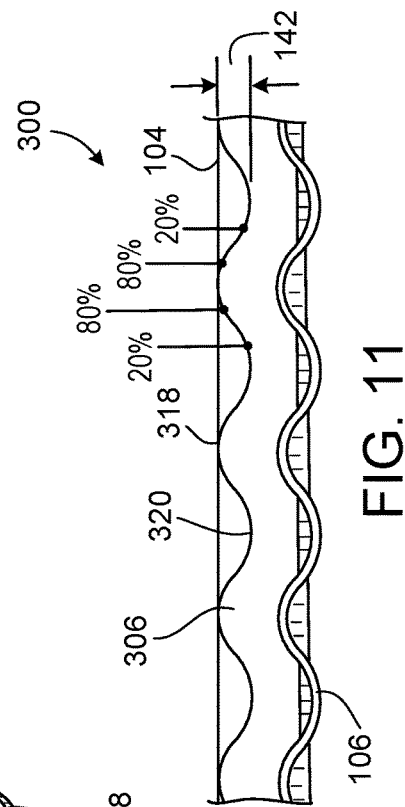
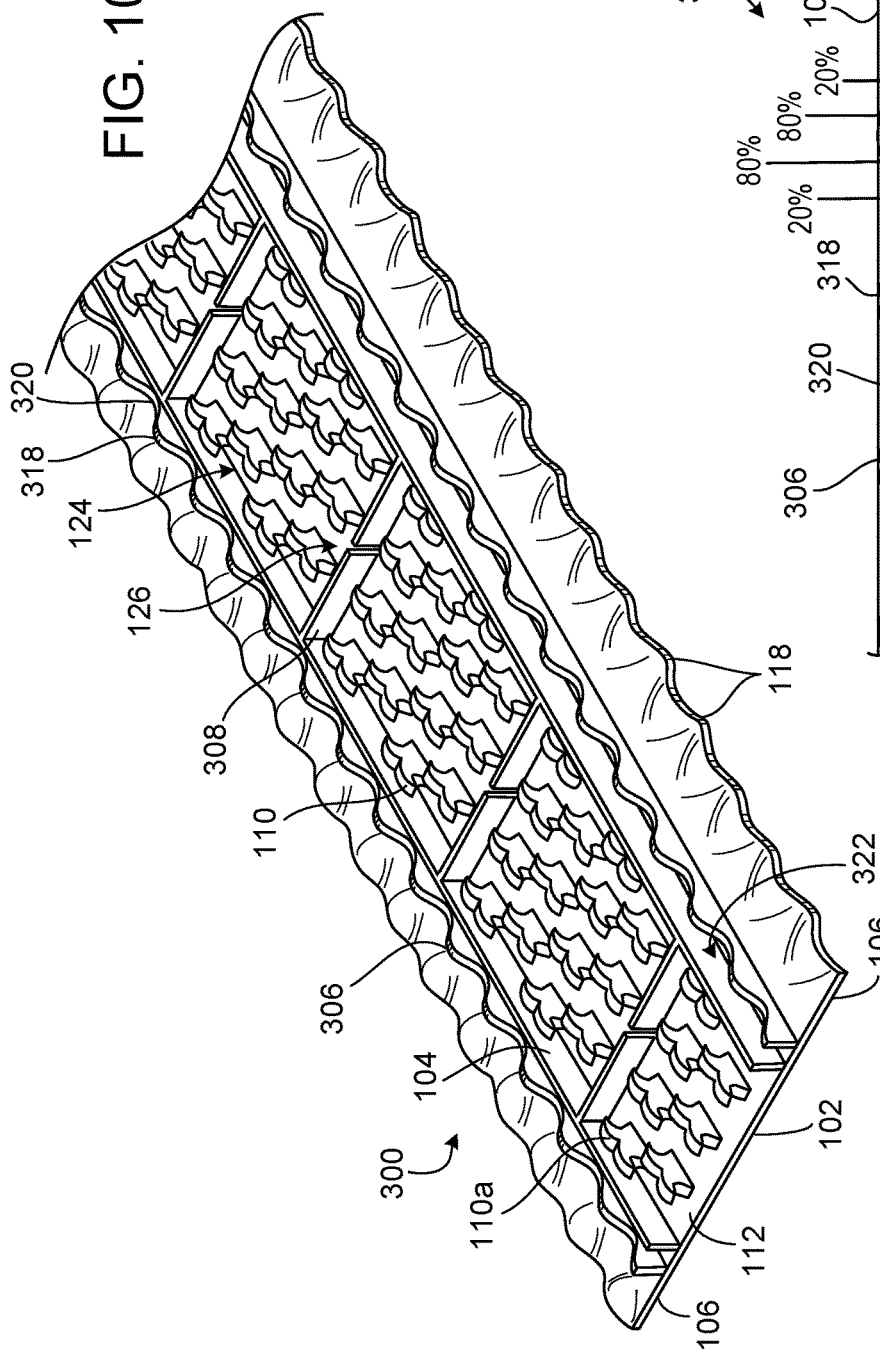

MOLD-IN TOUCH FASTENING PRODUCT

This is a continuation of U.S. Ser. No. 14/741,706, filed on Jun. 17, 2015, entitled Mold-in Touch Fastening Product. The disclosure of this prior application is hereby incorporated by reference in its entirety and is therefore considered part of the disclosure of this application.

TECHNICAL FIELD

The present invention relates to touch fastening products, and more particularly to touch fastening products configured to be incorporated into molded articles.

BACKGROUND

Traditionally, hook-and-loop fasteners comprise two mating components that releasably engage with one another, thus allowing coupling and decoupling of the two surfaces or objects. The male fastener portion typically includes a substrate having fastener elements, such as hooks, extending from the substrate. Such fastener elements are referred to as "loop-engageable" in that they are configured to releasably engage with fibers of the mating component to form the hook- and loop-fastening.

Among other things, hook-and-loop fasteners are employed to attach upholstery to car seat cushions. Car seat cushions are typically made of a foam material. To attach the upholstery to the foam, one fastener product is incorporated at a surface of the foam car seat and the mating component is incorporated into the upholstery, or is provided by the upholstery itself. The male fastener elements releasably engage with the mating component to couple the upholstery to the foam car seat.

To incorporate a male fastener product into a foam cushion, the fastener product may be positioned within a cushion mold, such that as foam fills the mold to form the cushion, the foam adheres to the fastener product. Flooding of the fastener elements by the foam during forming of the cushion is generally seen as inhibiting the usefulness of the fastener elements, and so several improvements have been made to attempt to avoid such foam intrusion.

Further advances in the design of fastener products are sought, for this and for other applications.

SUMMARY

One aspect of the invention features a male touch fastener strip having a front fastening face and a rear face, The strip has an elongated base, a field of exposed male fastener elements each having a stem extending from the base on the front fastening face of the strip, and a pair of wings, each wing extending from a respective longitudinal edge of the base outboard of the field of fastener elements. Each wing defines discrete corrugations extending in a series along the fastener strip and forming corresponding undulations in the rear face of the strip along longitudinal edge regions of the fastener strip.

In some cases, a side of the base opposite the fastener elements is essentially planar, and at least a portion of each undulation may extend at least partially rearward of the side of the base opposite the fastener elements.

The series of the corrugations may have a frequency of between 4 and 20 corrugation cycles per inch (2 and 8 per cm) along the fastener strip, for example.

In some examples the wings are each angled, in an unloaded state, toward the rear face of the strip. In some cases the elongated base defines a lateral plane containing its elongated edges, and in some fastener strips the wings each form a midpoint angle (defined with respect to the midpoint of the corrugation pattern) of between about 5 and 80 degrees (or between about 25 and 70 degrees) with respect to the lateral plane.

In some cases the corrugations define a corrugation amplitude, at outer edges of the wings, of at least two times a nominal edge thickness of the wings.

In some configurations, the wings are of substantially constant thickness throughout the corrugations.

The corrugations may define any of a number of different profiles at the outboard edges of the wings, such as a saw tooth profile or a sinusoidal profile, for example. The wings are also preferably void of fastener elements.

In some embodiments, the base is of a material comprising a magnetically attractable substance dispersed throughout a synthetic resin. For example, the magnetically attractable substance may include between about 30 and 40 percent of the material, by weight. The magnetically attractable substance may be in the form of discrete particles of the substance, such as particles comprise iron-containing powder, dispersed throughout the synthetic resin, for example.

In some examples, the wings are formed of the material, the wings and base together forming a contiguous mass of the synthetic resin. The fastener elements may also be formed of the material.

In some fastener strips, the longitudinal edges of the fastener strip feature changes in thickness between the base and the wings. The wings may be of a nominal thickness between about 20 and 90 percent of a nominal thickness of the base, the nominal thickness of the base may be between about 0.006 and 0.013 inch, and the nominal thickness of the wings may be between about 0.002 and 0.011 inch, for example.

In some cases the fastener strip also has longitudinal walls rising from the base on either side of the field of male fastener elements and inboard of the wings. The walls may be longitudinally continuous, and may each have a height at least as great as that of the male fastener elements.

In some embodiments each wing carries a respective strip of foam adhered to the wing on a same side of the fastener strip as the fastener elements, and in some cases overlaying the corrugations. In some examples the fastener strip has longitudinal end regions in which the front fastening face of the strip is covered by foam forming, in cooperation with the foam strips, an end barrier of the fastener strip. The covering foam and foam strips may be portions of a seamless foam layer. In some cases the end regions of the fastener strip are void of fastener elements.

The strips of foam may extend laterally beyond the wings, and may be adhered to the wings by adhesive.

In some examples the fastener elements each also have a head at an upper end of the stem and overhanging the base for engaging fibers.

Another aspect of the invention features a male touch fastener strip having a front fastening face and a rear face. The strip has an elongated base of a material comprising a magnetically attractable substance dispersed throughout a synthetic resin, and a field of exposed male fastener elements each having a stem extending from the base on the front fastening face of the strip. The base has an areal heat capacity of between about 15 and 65 (preferably, between about 45 and 65) milli-Joules per square centimeter degree C.

For some applications, the magnetically attractable substance comprises between about 30 and 40 percent of the material, by weight.

In some cases, the magnetically attractable substance is in the form of discrete particles of the substance (such as particles containing iron) dispersed throughout the synthetic resin.

In some fastener strips, the base forms the rear face of the fastener strip. The base may have a nominal thickness of between about 0.003 and 0.012 inch, for example.

In some cases the fastener strip also has longitudinal walls, such as longitudinally continuous walls, rising from the base on either side of the field of male fastener elements. The walls may also be formed of the materials.

In some embodiments, the fastener strip also has a pair of wings, each wing extending from a respective longitudinal edge of the base and angled, in an unloaded state, toward the rear face of the strip. In some cases, each wing defines discrete corrugations extending in a series along the fastener strip and forming corresponding undulations in the rear face of the strip along longitudinal edges of the fastener strip.

Another aspect of the invention features a method of forming a touch fastener strip. The method includes forming an elongated planar base with a field of male fastener elements extending from one broad side of the base, corrugating longitudinal edges of the elongated base to form edge corrugations, and plastically bending the longitudinal edge regions out of the plane of the base, toward a side of the touch fastener strip opposite the fastener elements.

In some examples the method also includes, after forming the planar base and before corrugating the longitudinal edges, heating the formed base.

In some embodiments, plastically bending the longitudinal edge regions occurs after corrugating the longitudinal edges.

Some examples also include forming longitudinally continuous walls extending from the base on either side of the field of male fastener elements.

Some examples of the method include adhering foam to longitudinal edge regions of the elongated base. The method may include, before adhering the foam to the longitudinal edge regions, eliminating the fastener elements in discrete regions spaced apart along the base. Adhering the foam may include adhering the foam to the base in the discrete regions, and the fastener elements may be eliminated by energy supplied by sonic horn, for example.

The method may include, after eliminating the fastener elements in the discrete regions, applying an adhesive to the discrete regions. Adhering the foam to the longitudinal regions may also include adhering the foam to the discrete regions.

Adhering the foam may include applying a widthwise-continuous layer of foam across the broad side of the base and over the field of fastener elements, such that the layer of foam is adhered in the longitudinal edge regions, and then removing a central portion of the foam layer to expose the field of fastener elements between remaining strips of foam adhered to the longitudinal edge regions.

Many of the features of the examples described herein can help to promote secure attachment of the fastener strip within a foam body, such as a seat cushion. At least some of these features derive in part from the realization that providing undulations or corrugations along the edges of a fastener strip can produce a beneficial effect in the ultimate strength of the attachment of the fastener strip to the foam body. Such effects can be further enhanced by forming the edges as corrugated wings that extend toward the back (non-fastening) face of the fastener strip, and even further by supporting an open cell foam on a front side of the angled wings.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a perspective view of an end portion of a first fastening product.

FIG. 2 is a side view of the product of FIG. 1.

FIGS. 10-12 are perspective, side and top views, respectively, of a third fastener product.

Like reference symbols in the various drawings indicate like elements.

DETAILED DESCRIPTION

Figure 3:
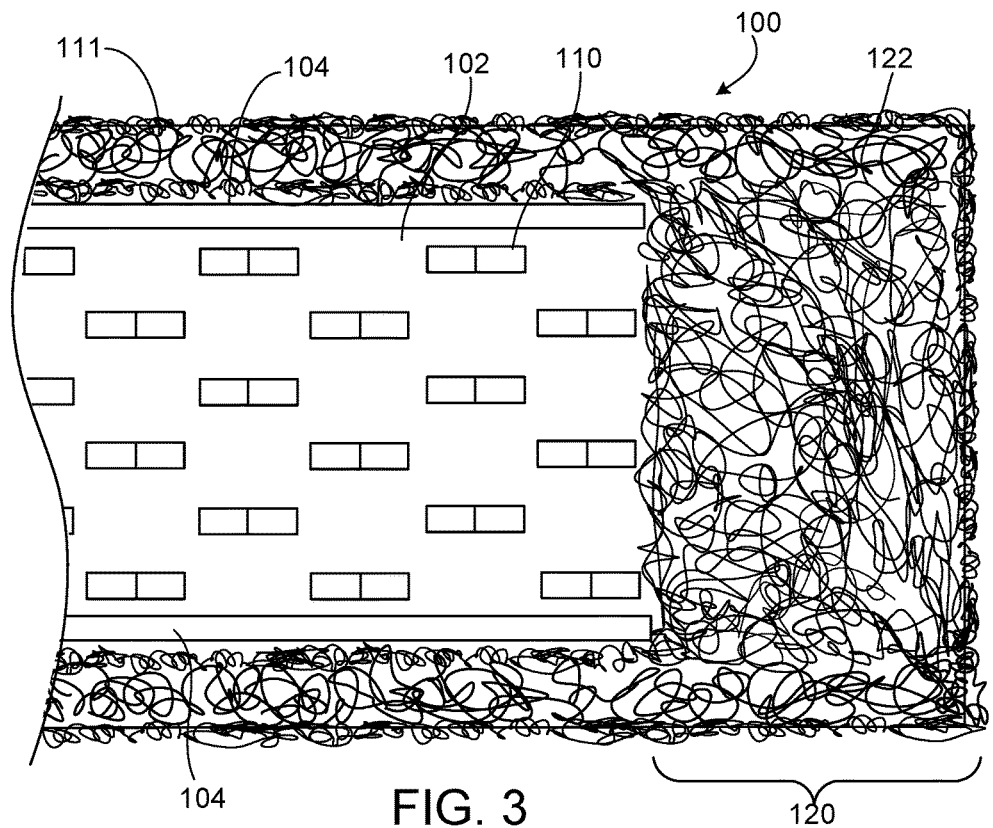
FIG. 3 is an enlarged top view of the product of FIG. 1.

Referring to FIGS. 1-4, a fastening product 100 includes a base 102, barrier walls 104, ruffled or corrugated wings 106, fastener elements 110, and foam strips 111 that functions as gaskets during foam molding. Base 102 defines a longitudinal (i.e., lengthwise) direction 101, and a lateral (i.e., widthwise) direction 103 that is perpendicular to the longitudinal direction. The base is a flexible, elongated strip of resin, molded unitarily and integrally with wings 106. Barrier walls 104 are continuous and extend integrally from an upper surface 112 of the base 102. In this example, the fastener product includes a pair of barrier walls spanning the length of the base in the longitudinal direction. Each of barrier walls 104 are positioned inboard of a respective longitudinal edge 114 of base 102.

When fastening product 100 is held against a flat surface, such as a surface of a mold pedestal (as discussed in detail below), barrier walls 104 contact the mold pedestal surface to help inhibit (if not prevent) flowing resin from contacting fastening elements 110. Accordingly, in this example, the height of barrier walls 104 is at least as great as that of fastener elements 110. In some implementations, however, barrier walls 104 can be slightly shorter than fastener elements 110 (e.g., 0.004 inch or less in height). In these implementations, the barrier walls may not contact the mold pedestal surface. In some examples, a gap exists between the barrier walls and the flat surface of the pedestal that is small enough to inhibit or prevent foam intrusion. In some examples, the fastener elements are configured to bend or compress when held by force against the mold pedestal, to bring the barrier walls in contact with the flat surface of the pedestal. In some examples, a second, segmented wall (not shown) extends from the base outboard of each barrier wall and inboard of each wing, defining flow gaps into which foam flows to further help anchor the fastener product in a foam seat bun. Some examples of fastener strips also feature lateral walls (not shown) that extend across the array of fastener elements, connecting barrier walls 104 at discrete point along the length and dividing the fastener array into discrete, bounded cells. In a particular example, barrier walls 104 extend from upper surface 112 of substrate 102 to a height of 0.051 inch, and have a thickness of 0.012 inch. In a particular example, the distance between facing surfaces of barrier walls 104 is 0.364 inch.

Figure 4:
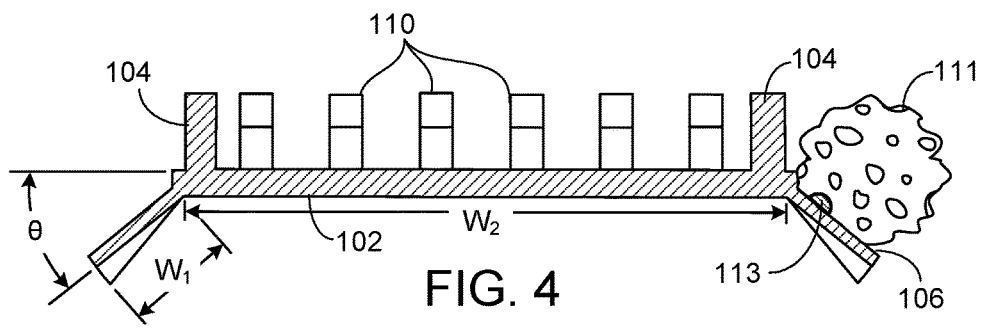
FIG. 4 is a cross-sectional view taken along line 4-4 in FIG. 1.

Each corrugated wing 106 is disposed outboard of a respective barrier wall 104 (in lateral direction 103), extending from a longitudinal edge 114 of base 102. As shown, each corrugated wing 106 is angled to extend toward the non-fastening side of the product, and defines a series of edge corrugations 118 along its length. In some examples, each wing has a width W1 that is between about 10 and 20 percent of the width W2 of the base 102. In this example, each wing has a width of about 2.5 mm while the base has a width of about 11 mm. Corrugations 118 define undulations that have an amplitude of 1.0 mm at their outer edges (or at least twice the nominal thickness of the wing at the outer edge), and a regular wavelength of about 2.5 mm, or an undulation frequency of about 10 undulations per inch. The amplitude of the undulations decreases with distance from the outer edges, such that at the inner edges of the wings the undulations have disappeared, while the thickness of the wing resin remains generally constant throughout the length and width of the wing, such that the undulations are equally evident on the front and rear faces of the wings. The undulations may be in the form, for example, of a sinusoidal wave or a saw-tooth triangular wave (with sharp or radiused apexes). As shown in FIG. 4, the wings each extend, in an unloaded state at a midpoint angle θ of about 45 degrees, measured between the plane of the rear surface of base 102 and a plane bisecting the undulation of the wing.

A strip of compressible, open cell foam 111 is adhered to the upper or front surface of each wing 106 with a bead of hot-melt adhesive 113. (The foam and adhesive are omitted from the left wing in FIG. 4, for clarity.) As will be discussed in more detail below, foam strip 111 is slightly compressed against the mold surface during foaming and both helps to prevent foam intrusion from reaching the fastener elements, and helps to anchor the product in the foam. Flowing and expanding foam at least partially penetrates into the open cells of the foam strip. The compressibility of the foam also helps to accommodate imperfections in a mold pedestal surface (e.g., scratches, dents, or uneven surfaces) that could otherwise allow foam to flow past the barrier walls 104 and into contact with fastener elements 110. Uncompressed, the foam extends about three millimeters from the upper surface of each wing, or to a height of more than twice the height of the fastener elements. Angling the wings 106 toward the rear of the product allows for use of thicker foam strips, enhancing the area of open cell foam accessible for penetration by the foaming resin. As evident from FIGS. 3 and 4, when viewed from the fastening side of the strip the foam extends slightly beyond the molded resin of the strip on all sides.

The corrugated wings 106 help with retention of the fastener product in the foam of the seat bun. Because of the corrugations, the wings have a greater surface area than flat wings of an equivalent width. The greater surface area provides more area for bonding with foam. In this example, the wings are also thinner than the base, having a constant nominal thickness of only about 0.003 inch, while base 102 has a nominal thickness of about 0.010 inch, such that even with the undulations the wings do not represent a significant material cost. The corrugations also act to stiffen the thin wings against bending, such that the wings generally maintain their orientation during foam molding—without the need for stiffening ribs and other projections adding mass. The corrugations also present localized flow dams that direct small amounts of foam into gaps between the wings and the foam strips 111, aiding in retention, and the undulations on the rear face of the product are believed to locally alter the foam flow across the back of the fastener strip so as to disrupt the formation of larger foam cells, creating a more randomized pattern of cells that helps to avoid local weak points in the formed foam and enhance bonding to the rear surface of the fastener product.

Fastener elements 110 are flexible and extend upward from upper surface 112 of base 102. The fastener elements are arranged in an array between barrier walls 104. Each of fastener elements 110 has a head spaced above upper surface 112, and each head has two distal tips that extend in opposite directions to form loop overhangs (i.e., palm-tree type fastening elements). Thus, the fastener elements are configured to releasably engage fibers of a mating component (not shown) to form a hook-and-loop fastening. Other appropriate types of fastening elements can also be used. For example, J-hook and/or mushroom-type fastening elements can be implemented.

Figure 5:
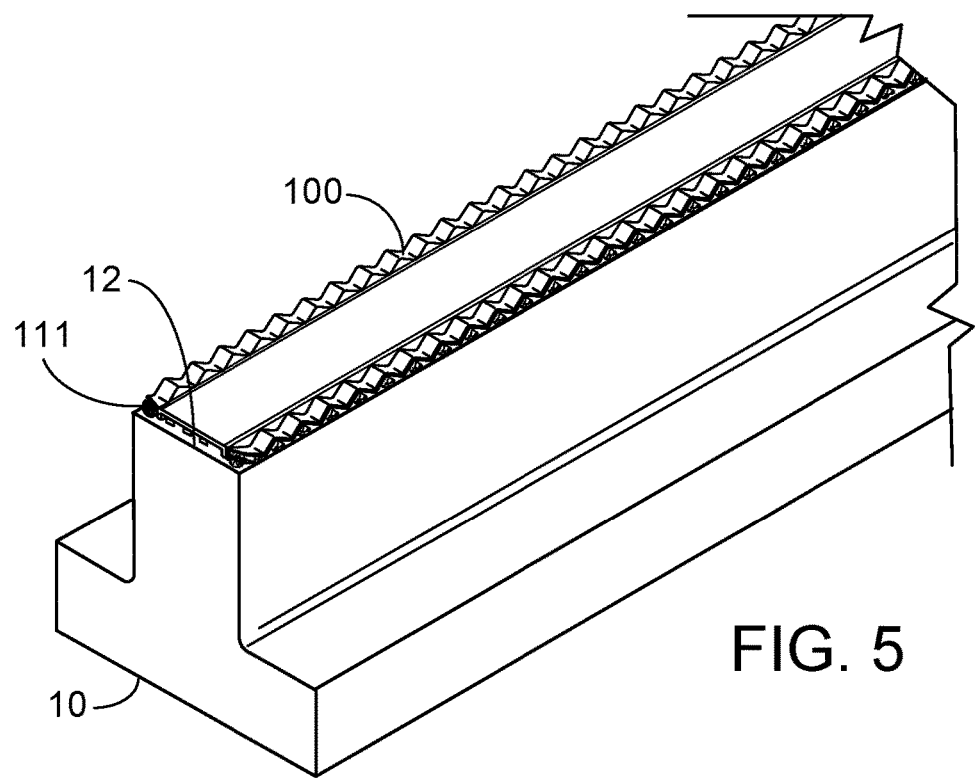
FIGS. 5 and 6 are perspective and side views, respectively, of the product of FIG. 1, held against the surface of a mold pedestal.
Figure 6:
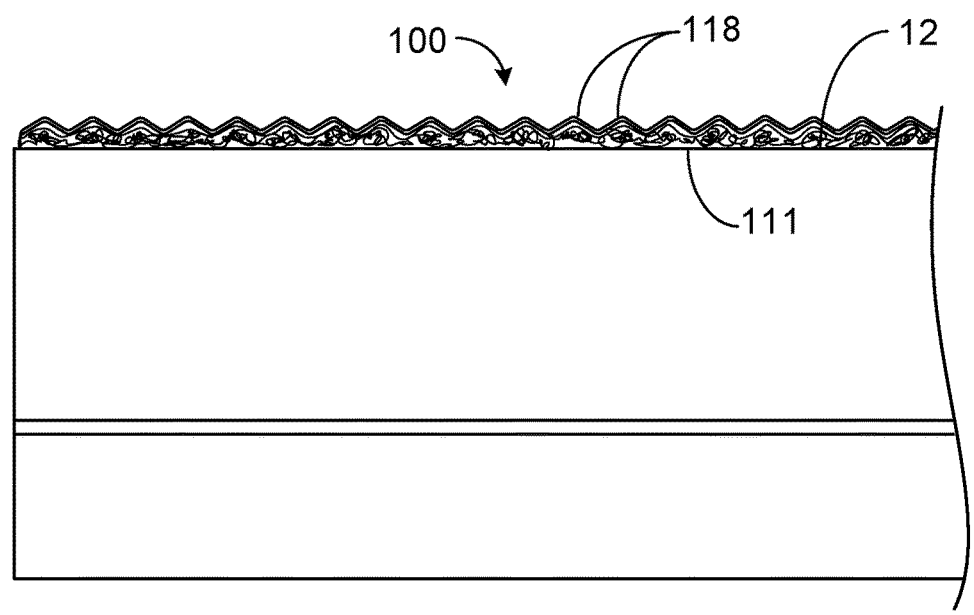

Referring also to FIGS. 5 and 6, fastener product 100 can be held against a mold pedestal 10. One or more portions of fastener product 100 can be formed of a magnetically attractable substance, such that the fastening product is attracted by a magnet to hold it against a flat mold pedestal surface 12. In this example, the base, walls, fastener elements and wings of the product are all formed of a synthetic resin in which magnetically attractable substance (in particular, magnetite or an iron powder) is dispersed. As molded, all of these portions of the product together form a contiguous mass of the synthetic resin. One suitable nano-suspended composite resin has about 35 percent by weight magnetite powder of a particles size of about 10 to 40 micrometers suspended in a matrix of impact-modified nylon (such as a blend of 6 and 6-6). When fastener product 100 is held against mold pedestal 10, its foam strips are compressed against mold pedestal surface 12 such that flow of foam is prevented from flooding the field of fastener elements.

Figure 7:
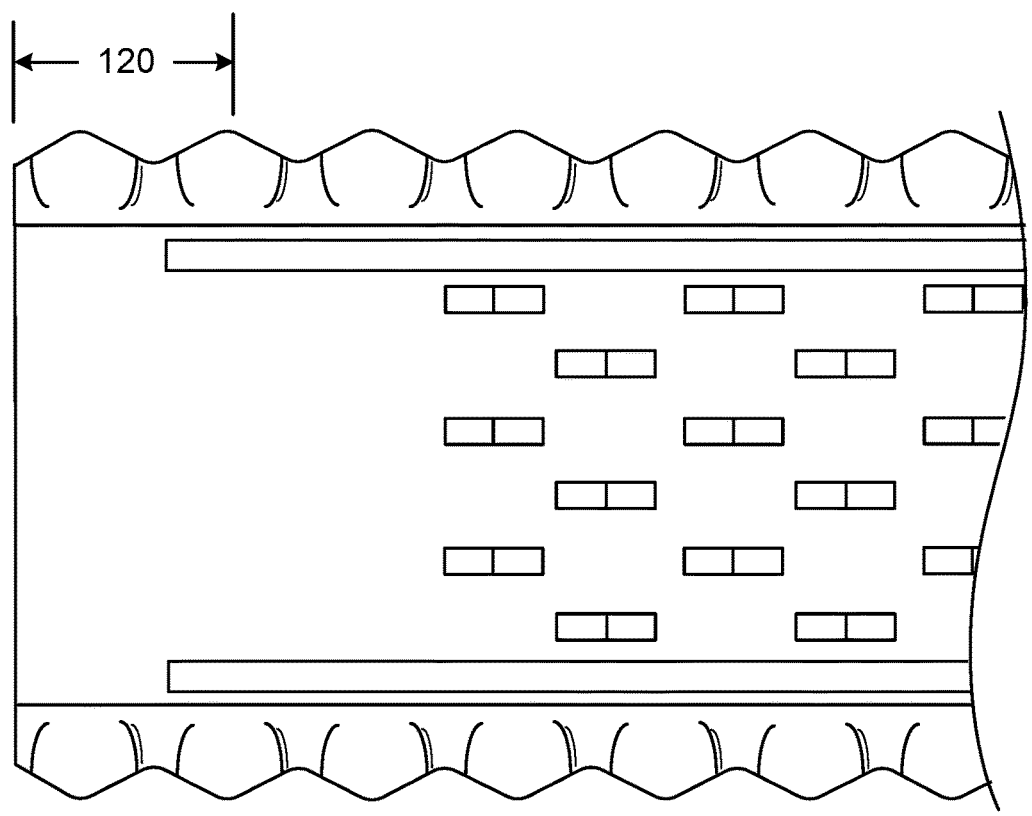
FIG. 7 is a top view of an end region of the product of FIG. 1, with the foam removed.

As shown in FIGS. 1 and 3, both ends of the fastener product are sealed against the surface of the mold with end gaskets 122 of open cell foam extending across the width of the product and connecting the foam strips 111. FIG. 7 shows an end of the product without the foam strips or end gaskets, showing that in an end region 120 the base 102 is void of fastener elements and walls. Such a flat end region can be formed by obliterating molded fastener elements and walls near the ends of the product, before application of the foam gasket and strips, which can be supplied as a unitary foam layer, as described below.

Figure 8:
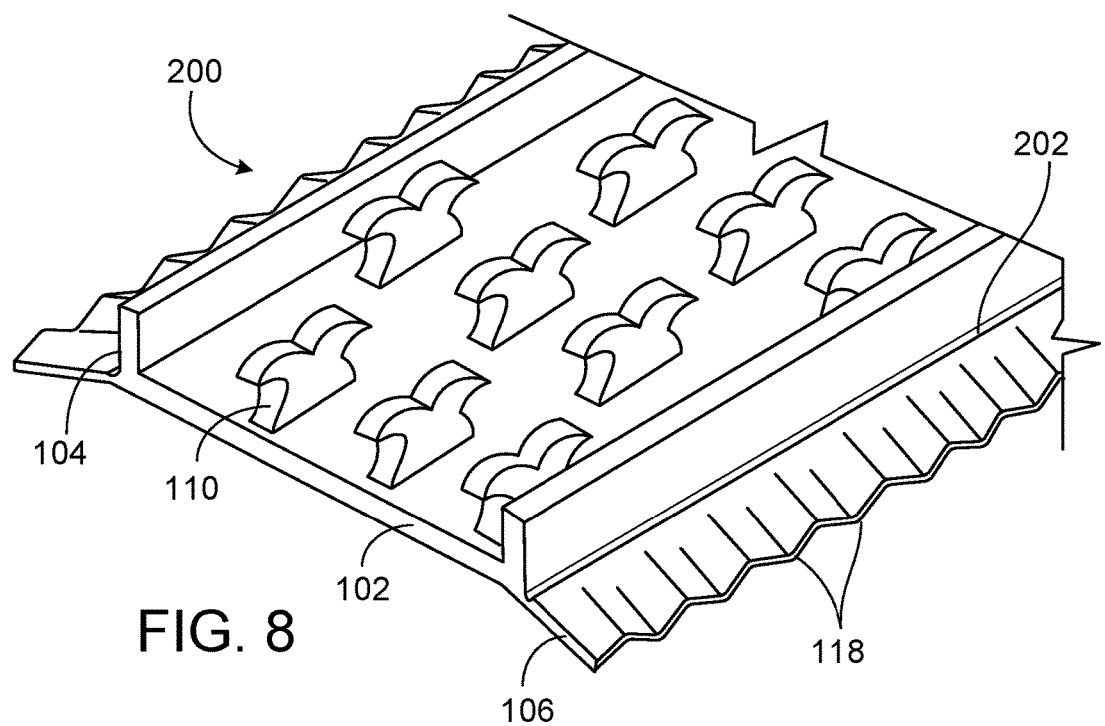
FIGS. 8 and 9 are perspective and end views, respectively, of a second fastener product.
Figure 9:
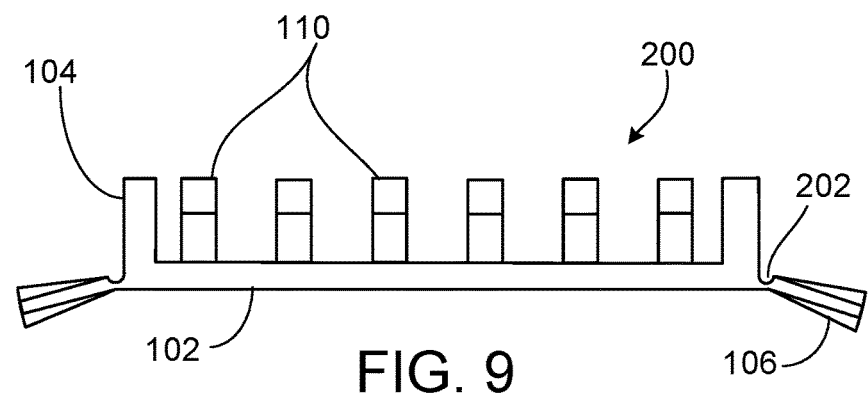

Referring to FIGS. 8 and 9, another example fastener product 200 has wings 106 that are connected to base 102 at hinges 202. Fastener product 200 is similar in its configuration to fastener product 100. For example, fastener product 200 includes a base 102, barrier walls 104, and fastener elements 110. However, product 200 does not include foam strips along its edges, although it may include foam end gaskets (not shown). Hinges 202 are incorporated into the upper surface of the strip adjacent the outer surfaces of barrier walls 104. In this example, hinges 202 are provided in the form of continuous indentations integrally molded with the base 102 and corrugated wings 106. In some examples, the indentations are at most only half as deep as the nominal thickness of the wings. Other implementations of the hinges can also be used (e.g., perforations or folds).

Hinges 202 allow the corrugated wings of the fastener strip to flex relative to base 102. The degree of flexure is determined based on the material properties and dimensions of the hinges. Allowing the wings to flex relative to the base of the fastener strip can reduce stress near the longitudinal edges of the base. These stresses can result from various operations in forming the molded foam article. For example, in molding the article, stress is imparted on the fastening product near its longitudinal edges when foam expands adjacent the edges of the strip. High stress also occurs during other common processes such as de-molding and roller crushing. When the fastener product is secured to the molded product, the hinges allow the embedded wings to move with the cured foam. As a result, crack formation and propagation near the longitudinal edges is inhibited.

As shown, hinges 202 extend longitudinally along the length of the substrate, substantially parallel to the barrier walls of the fastening product. However, in some examples, the fastening product can include lateral hinges that traverse the width of the fastener product. The lateral hinges can be incorporated into the backside surface of the base, and disposed at predetermined intervals down the length. Incorporating lateral hinges into the fastening product can increase flexibility in the longitudinal direction, such that the fastening product is more suited for winding about a take-up roll and forming a continuous spool.

Figure 12:
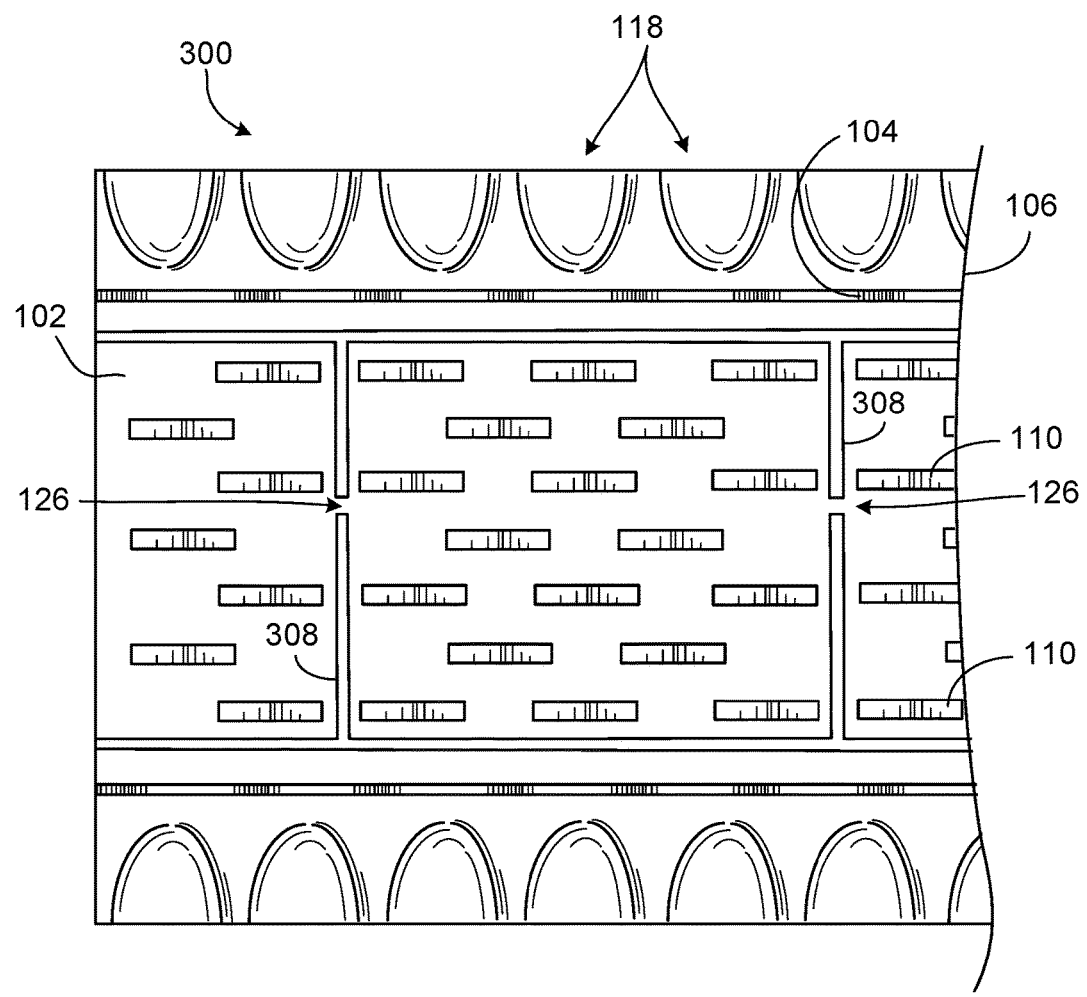

Referring next to FIGS. 10-12, fastening product 300 includes a base 102, barrier walls 104, corrugated wings 106 and fastener elements 110 as in the above embodiments, but also includes wave walls 306 and lateral walls 308 that also extend integrally from upper surface 112 of base 102. A foam relief space 322 is defined between each barrier wall 104 and its corresponding wave wall 306, which further assists in anchoring the product 300 to a molded foam cushion. Each of the lateral walls 108 extends between facing surfaces of barrier walls 104 to define a longitudinal column of bounded fastening cells 124 containing one or more of the fastener elements 110. The wave wall 306 is a continuous wall configured with a wave shape that gradually rises and/or falls along the longitudinal direction of the product so as to provide one continuous element, rather than defining a plurality of discrete elements that rise and fall abruptly by virtue of substantially vertical edges. The wave shape defined by the wave wall 306 may be periodic (repetitive) as shown but need not be. In any case, when abutted against a mold pedestal used for forming foam cushions (or some other molded product), the wave shape provides one or more intentional openings or "flow gaps" that allow an appropriate amount of foam resin to flow into the foam relief space 322 during the manufacturing process, so that the fastening product 300 effectively becomes integrated with or otherwise anchored to the foam cushion being formed. Not wishing to be held to a particular theory, it is believed that the gradual rising and/or falling of the wave wall 306 allows the openings or flow gaps to be smaller than openings or flow gaps formed by discrete elements that rise and fall abruptly (substantially vertical rise and fall edges). In addition, the wave shape also allows the wave wall 306 to be both a single continuous element and flexible in the longitudinal direction, while maintaining rigidity in the lateral direction.

The wave shape of wall 306 can be, for example, sinusoidal, triangular, saw tooth (ramp), or any other shape that includes a gradual rising edge, or a gradual falling edge, or both gradual rising and falling edges. Alternatively, wall 306 could be replaced with a series of discrete wall segments having substantially vertical edges (e.g., 90 degrees, +/−5 degrees) and defining gaps therebetween. In some embodiments, such as the one shown in FIG. 11 for example, the slope of a straight line connecting the 20% and 80% points of a given waveform edge is in the range of about 3 degrees to about 65 degrees (assuming that 0 degrees is perfectly horizontal and 90 degrees is perfectly vertical, and further assuming that the 0% point is the lowest point along a given edge and the 100% point is the highest point along that edge). Further note that the wave shape of wall 306 may be symmetrical, but need not be (e.g., rising edge can be steeper than the falling edge, or vice-versa). Further note that the wave shape of wall 306 may be repetitive the entire length of the product 300, but need not be (e.g., multiple wave shape types may be used along the length of wall 306). While only one wave wall is shown along each side of the product, multiple parallel wave walls can be provided on each side, with staggered wave patterns to form a more tortuous path for foam to flow through to reach the barrier walls. Numerous suitable wave wall configurations can be used as will be apparent in light of this disclosure.

In this example, wings 106 are corrugated to have an embossed sinusoidal wave pattern at their outer edges, with an amplitude that decreases with distance from the edge. Furthermore, in this example the wings extend generally laterally from the edges of the base and are not angled rearward. Portions of each undulation cycle may extend behind a rear surface of the base, but another portion of the cycle will extend forward of surface 112. While this pattern is regular and of a constant amplitude and period, varying corrugation patterns are also envisioned. Furthermore, in some cases the amplitude of the corrugation may be constant over a significant width of the wing, diminishing only adjacent the base edge.

Figure 13:
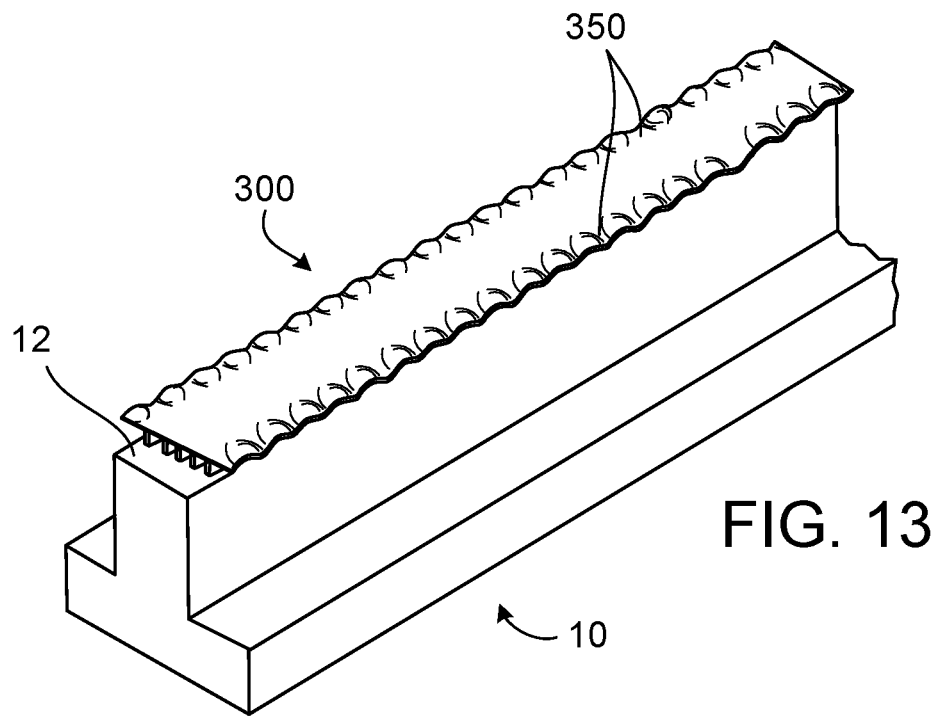
FIGS. 13 and 14 are perspective and side views, respectively, of the product of FIG. 10, held against the surface of a mold pedestal.
Figure 14:
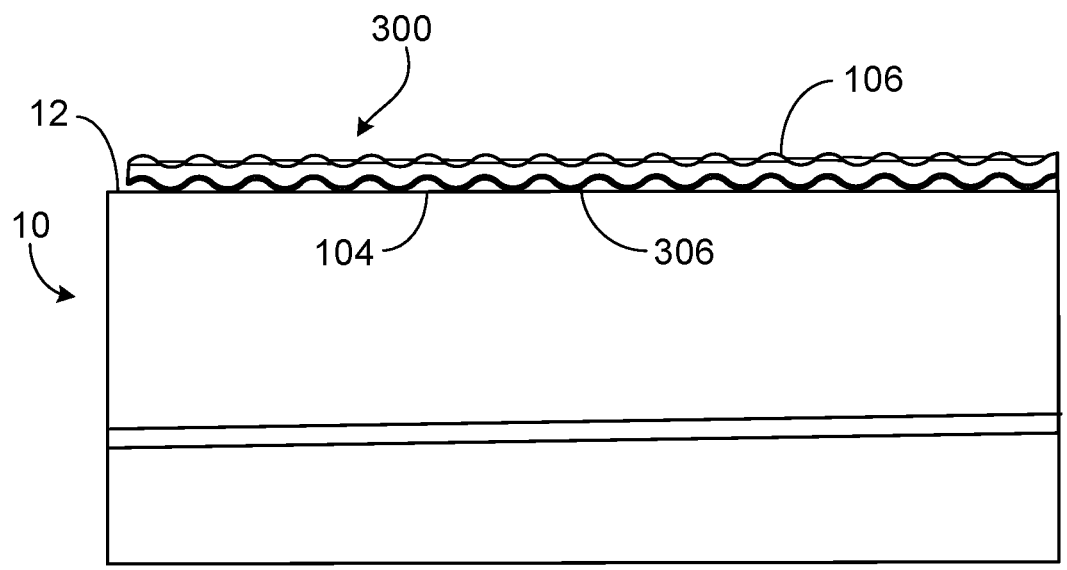

When fastening product 300 is held against a flat surface, such as a surface of a mold pedestal (as shown in FIGS. 13 and 14), barrier walls 104 contact the mold pedestal surface to inhibit (if not prevent) flowing foam resin from infiltrating cells 124 and contacting fastening elements 110. Accordingly, in such a case, the height of barrier walls 104 is the same or greater than that of fastener elements 110. Each wave wall 306 is disposed outboard of a respective barrier wall 104. Also evident in FIG. 13 are the undulations 350 formed by the corrugations of the wings in the rear face of the fastener strip along its longitudinal edge regions.

Referring back to FIGS. 10-12, each of wave walls 106 of this example embodiment includes a sinusoidal wave shape that includes symmetrical peaks 318 and troughs 320 so as resemble a sine wave signal having a 50% duty cycle. As visible in FIG. 11, peaks 318 are the same height as the barrier wall 104, and the troughs 320 are a distance 142 from the barrier wall 104 top. In some example cases, for instance, the period of the wave ranges from about 0.05 to 0.2 inches (e.g., 0.09 to 0.16 inches), and distance 142 ranges from about 0.02 to 0.10 inches (e.g., 0.03 to 0.06 inches). The minimum percentage of the wave wall that troughs 320 can dip from the top of the wall will depend on factors such as the fluidity of the foam and the desired fill pattern of the relief spaces 322. In some specific example cases, the ratio of depth 142 to the overall height of wave wall 306 is in the range 5% to 50%. As will be appreciated, the depth 142 can be thought of as a peak-to-peak amplitude of the wave shape in wall 306, and sized to provide a desired flow gap. To this end, the ratio can be expressed as peak-to-peak amplitude divided by overall wave wall height (as measured from top most edge to the bottom of wave wall 306 at surface 112). To give some further context with respect to size of product 300, according to some such example embodiments, the length of product 300 in the longitudinal direction may be in the range of, for instance, 4 to 24 inches, and the width of product 300 in the lateral direction may be in the range of, for instance, 0.4 to 2.0 inches. In addition, the height of a given product 300 so configured could be, for example, in the range of 0.06 to 0.4 inches (as measured from the underside of base 102 to the top of barrier wall 104), wherein the fastening elements have a similar height (as measured from the underside of base 102 to top of fastener element 110).

As previously explained, the one or more openings formed by virtue of the rising and falling of the wave shape when product 300 is abutted with a mold surface allow a flowable material (e.g., a liquefied or partially expanded foam) to pass over (or under, as the case may be) the wave wall 306 and into the corresponding foam relief space 322. The opening(s) have an overall definable area which can be generalized as the missing portion(s) of wall 306 (if wall 306 where intended to be rectangular in shape rather than wave-shaped). In some embodiments, peaks 318 of wave wall 306 contact the mold surface, thereby defining a plurality of openings, while in other embodiments peaks 318 of wave wall 306 do not contact the mold surface, thereby defining a single continuous wave-shaped opening. In either case, the overall area defined by the one or more openings is in the range of, for example, about 4 to 45 percent of the wall 306.

To this end, each of wave walls 106 defines an overall flow gap, formed of the one or more openings. An overall flow gap can be described as the total exposed area of all flow enabled openings of the wave wall 306. In this example, each of wave peaks 318 has a height equaling that of barrier walls 104. Accordingly, each opening is widest at the lowest point of trough 320 and gradually tapers in each direction until the neighboring peaks 318 are reached so as to effectively define a series of tapered flow gaps of each wave wall 306. Each of these tapered flow gaps contributes to the overall flow gap. The tapering of the flow gap(s) is believed to contribute to better resin flow management and control, because the area of tapered flow gap can actually be smaller than a non-tapered flow gap while still allowing a better distributed flow of foam into the relief space 322, thereby improving integration/anchoring of the product 300 into the foam cushion being formed. It may be helpful to measure the dimensions of the flow gap(s) in terms of area per unit strip length of base 102, although there are other ways to quantify and characterize the flow gap(s), such as by the slope of the rising and/or falling edges. In some examples, and as previously explained, the flow gap(s) constitute between 5 percent and 40 percent of the effective area of the wave walls 106. By way of contrast, note that with a non-tapered flow control arrangement (substantially vertical rise and fall edges), the flow gaps constitute between 15 percent and 50 percent of the effective area of the non-tapered walls, based on comparison studies and evaluation. In general, it is believed to be more difficult to reliably control resin flow with a larger non-tapered flow gap area, so the reduction in flow gap area by way of gradual tapering is beneficial.

Foam passing through wave walls 306 enters foam relief spaces 322. The foam relief spaces 322 are delimited by a respective wave wall 306 and its nearest barrier wall 104. The dimension of a foam relief space 322 can be measured, for example, in terms of its volume per unit strip length of base 102. The volume per unit strip length can be defined as the product of the distance between facing surfaces of a respective wave wall 306 and its nearest barrier wall 104 and the height of the barrier wall 104. As will be appreciated in light of this disclosure, the fill pattern within the foam relief space 322 resulting from a tapered flow gap tends to be more evenly distributed than the fill pattern within the foam relief space 322 resulting from a non-tapered flow gap.

A number of benefits associated with foam relief space will be appreciated. For instance, allowing the foam to set-up around wall 306 and within relief space 322 increases the bond strength between fastening product 300 and a foam molded article, such as a seat component for automobiles, trucks, trains, planes, and other such vehicle seats. Another benefit is that, in some cases, imperfections in a mold pedestal surface (e.g., scratches, dents, or uneven surfaces) can allow foam to flow past the barrier walls 104 and into contact with fastener elements 110. This can be inhibited (if not prevented), however, by permitting foam to enter and set-up in foam relief spaces 322. In some examples, the cured or solidified foam can form an integral seal with the mold tool surface, preventing flow past the barrier walls. More details concerning the sizing and arrangement of wave walls 306 and relief spaces 322 can be found in pending U.S. patent application Ser. No. 14/697,838, filed Apr. 28, 2015, and incorporated by reference herein in its entirety.

In this example, lateral walls 308 laterally traverse an inner area between facing surfaces of respective barrier walls 104 to isolate arrays of fastener elements 110. In some implementations, however, the lateral walls 308 extend beyond the barrier walls 104, traversing the inner area between facing surfaces of the outer wave walls 306. Lateral walls 308, in conjunction with barrier walls 104 demarcate individual fastening cells 124. The fastener cells are effectively sealed against ingress of foam, when the fastening product 300 is held against a surface of a mold pedestal. In some embodiments, each lateral wall 308 defines one or more gaps extending through the wall and connecting adjacent fastening cells 124. For instance, in this example shown in FIGS. 10-12, each lateral wall 308 defines one gap 126. The gaps 126 can extend from the upper surface of the base 102. The gaps 126 can also extend through an upper extent of the lateral walls 308. Other appropriate gap configurations, however, can also be implemented (as will be described in turn). In still other embodiments, there are fewer or no gaps 126. For instance, in one example embodiment, every other lateral wall 308 has no gap 126, and is therefore continuous.

The gaps 126 each define a lateral width. An appropriate lateral width of the gaps 126 can be configured to provide certain desired properties of the fastening product 300. For instance, gaps 126 can be sized to simultaneously provide air-releasing capability, bending flexibility, resistance to foam intrusion, and retention. In some examples, the lateral gap width is between about 0.002 and 0.015 inches, or between about 0.004 and 0.012 inches. In one specific example case, the lateral gap width is about equal to a lateral width of a fastener element 110, which is sufficient to allow air-flow but not necessarily sufficient to allow flow of foam (depending on foam type and its flowability at dispensing time). In some implementations, the lateral width of gaps 126 is constant over different distances from upper surface 112. In some other implementations, the lateral width of the gaps 126 tapers or otherwise varies with distance from upper surface 112 (e.g., the gaps are wider at their distal extent than at a height closer to upper surface 112). In any such cases, providing a fastening product 300 with gaps 126 extending through lateral walls 308 separating fastening cells 124 can permit air to flow between the cells 124 during the mold-in process, and can in some cases help to avoid undesirable lifting of the fastening product from the mold surface due to air expansion, and may equalize pressure between cells 124, helping to avoid 'burping' or rapid release of air from under the fastening product. Such gaps 126 can also increase the flexibility of the fastening product, permitting the fastening product to more readily bend about an axis running along its length, or to otherwise conform to curved mold surfaces without buckling. Additionally, during the forming process, the foam may flow into fastener cells 124 adjacent ends of the product through the gaps, which may further help to anchor the ends of the fastening product in the molded foam article.

As shown in FIGS. 10 and 12, the lateral walls 308 are disposed at predetermined intervals down the length of the base 102. In this manner, lateral walls 308 allow fastener product 300 to be manufactured in continuous spools that can be severed to form various lengths of fastening strips, without the need of applying any foam end gaskets. In some examples, the inner surfaces of the lateral walls 308 are spaced apart from one another by between about 0.3 and 1.0 inches (e.g., about 0.5 inches in one specific example embodiment). In some examples, a continuous spool of the fastener product can be severed so as to leave a number of fastening elements 110a exposed to foam (as shown in FIG. 10). The exposed fastening elements 110a can act as additional anchor points to the molded foam article. Further, as with barrier walls 104 and wave walls 306, lateral walls 308 can extend integrally from upper surface 112. The height of lateral walls 308 can be equal to that of barrier walls 104.

Figure 15:
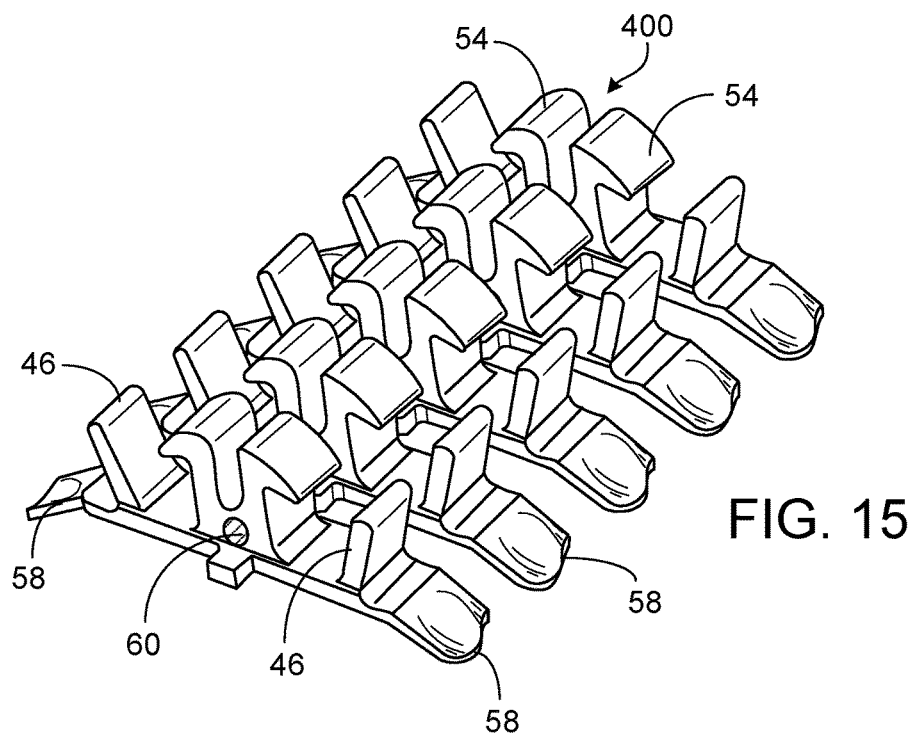
FIG. 15 is a perspective view of a fourth fastener product.

Referring next to FIG. 15 product 400 is a clip retainer that is embedded in the bottom of a foam trench of a seat bun, for retaining associated clips (not shown) to attach a seat cover trim strip. In this example, the product has a segmented base that allows the strip to be articulated to follow a curved trench, for example. Each base segment carries a pair of laterally directed, spaced apart hooks 54 extending upward from a continuous base, and a pair of guide walls 46 on either side. The guide walls extend upward at a slight angle. Further details of the general structure and use of product 400 in a fastening system can be found in pending PCT application number PCT/EP2014/054554, filed Mar. 10, 2014, and incorporated herein by reference.

Figure 16:
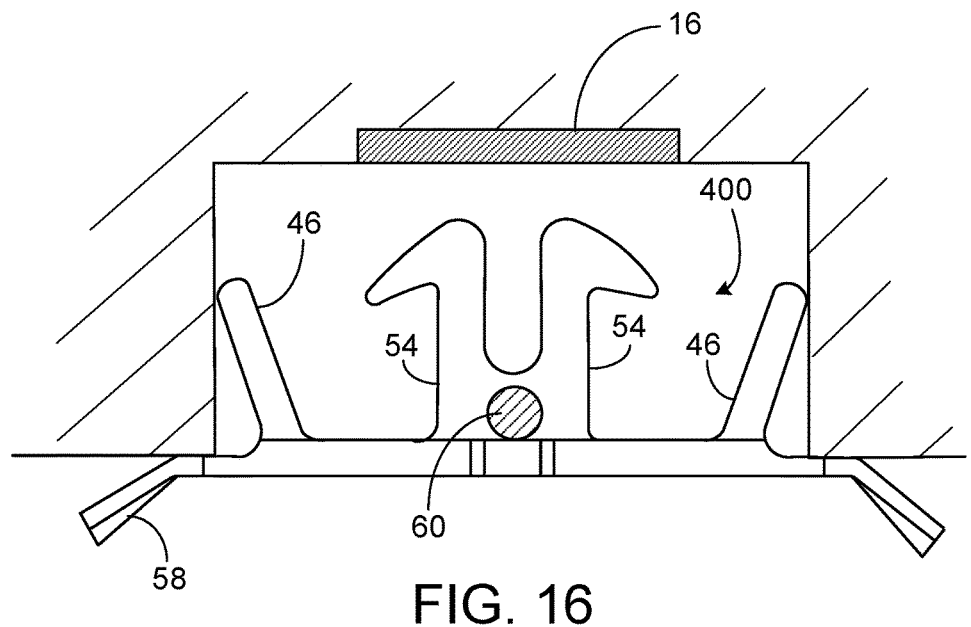
FIG. 16 is an end view of the fastener product of FIG. 15, showing the product positioned in a molding trench.

The lateral ends of each base segment feature wing segments 58 that are angled toward the non-fastening side of the product. Each wing segment features one or more undulations molded into its outer edge. With the product placed into a trench in a mold, as shown in FIG. 16, the wing segments 58 extend away from the mold surface and are thereby embedded in foam during a subsequent molding operation. A metal wire 60 molded into the product at the base of the hooks 54 is attracted by a magnet 16 at the base of the trench, holding the product against the mold surface during foaming. The guide walls 46 are spaced to bear against the sides of the trench, positioning the product.

Figure 17:
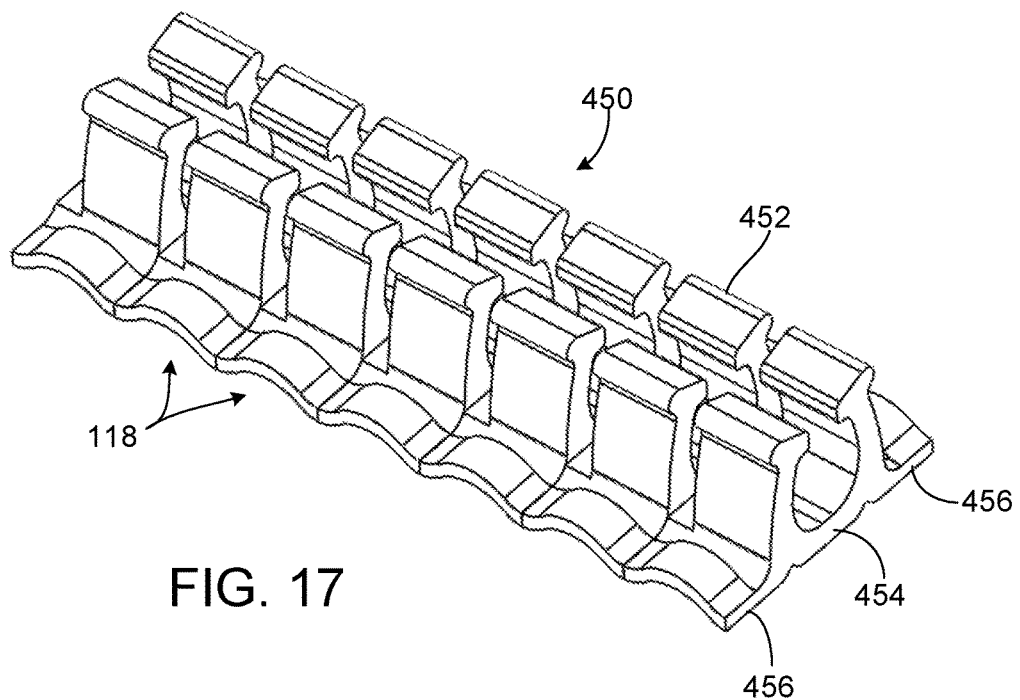
FIGS. 17 and 18 are upper and lower perspective views of a fifth fastener product.
Figure 18:
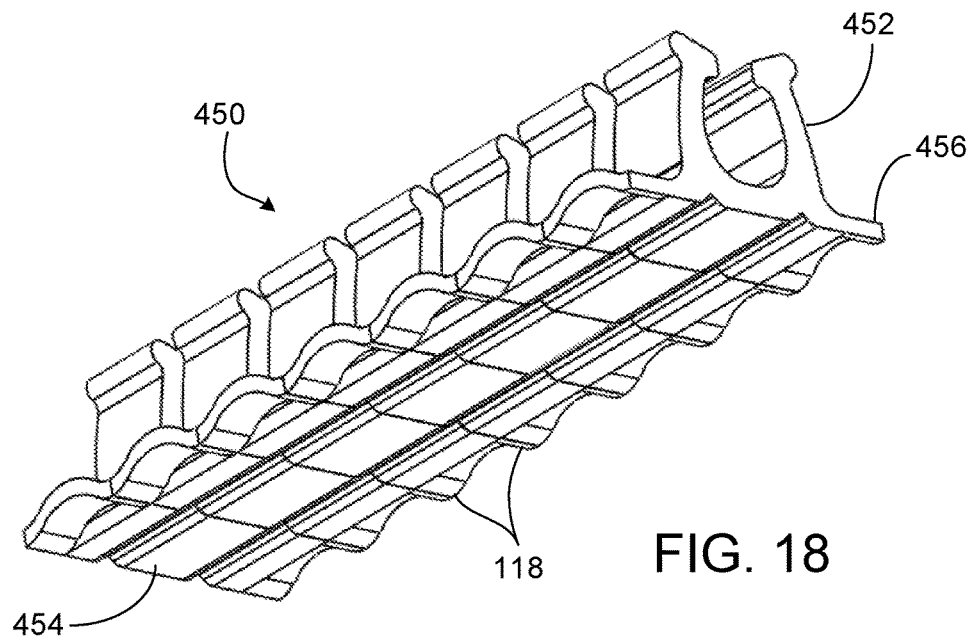
Figure 19:
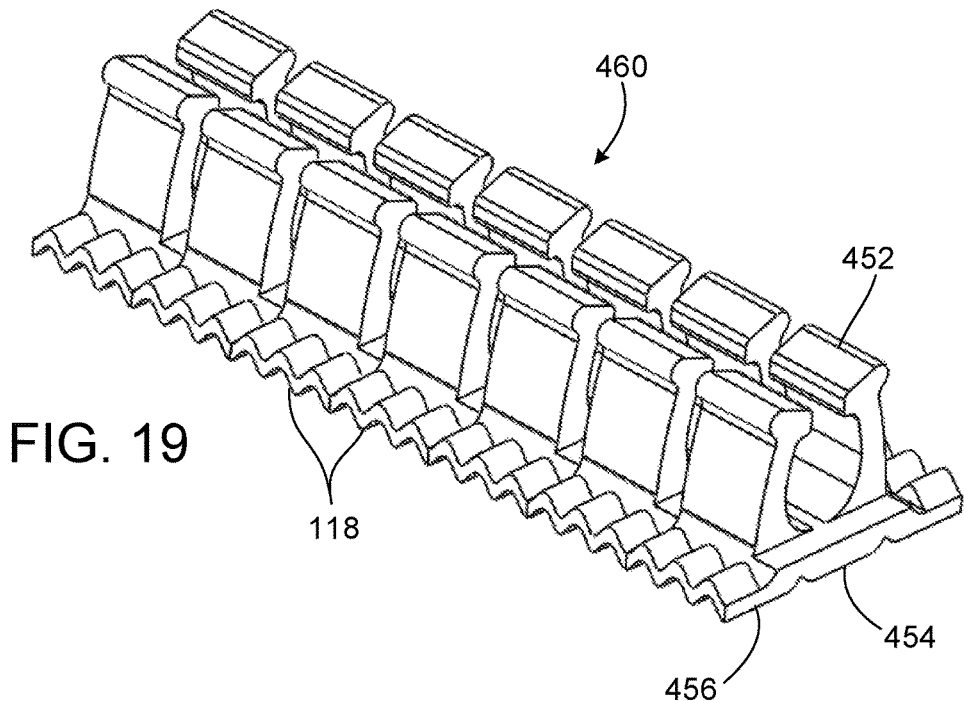
FIGS. 19 and 20 are upper and lower perspective views of a sixth fastener product.
Figure 20:
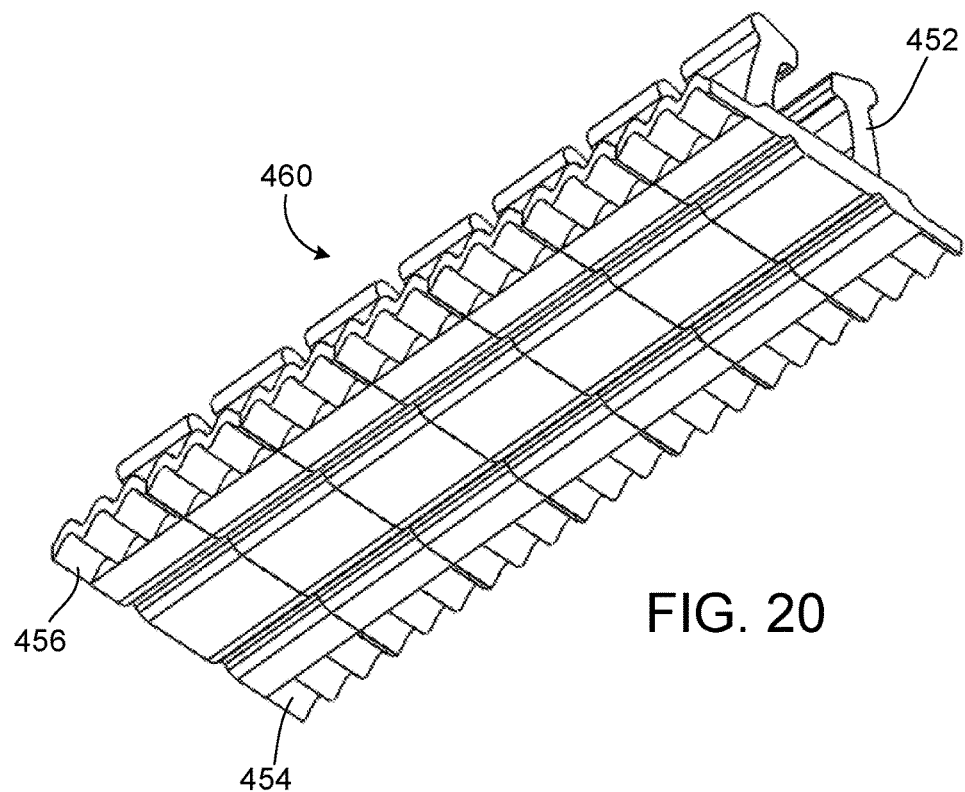

Referring next to FIGS. 17 and 18, molded clip product 450 has a series of pairs of projections 452 extending from a base 454 and defining a central channel extending along the product and sized to receive and retain a listing bead. Wings 456 extend from either side edge of the base and define corrugations 118 having a period about equal to the spacing of projections 452. The product 460 of FIGS. 19 and 20 is identical but with a higher frequency of corrugations 118 along the wings, in this case about three corrugation cycles per projection 452.

Figure 21:
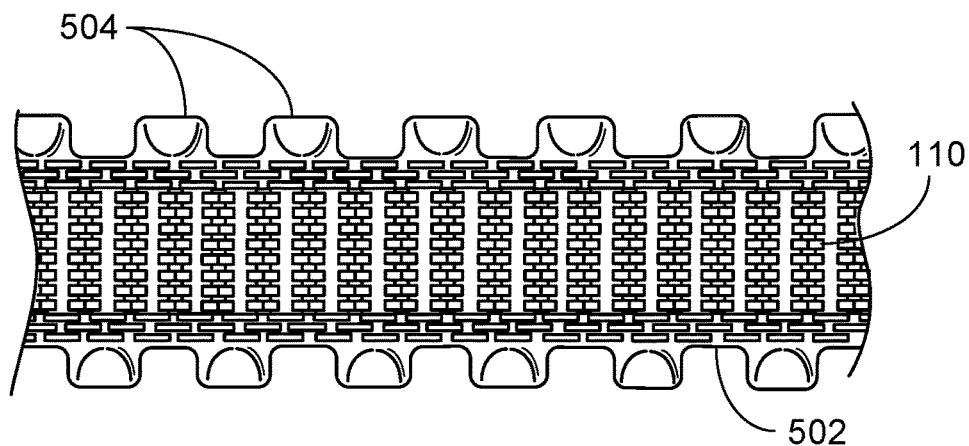
FIGS. 21-23 are front, enlarged side, and end views, respectively, of a fifth fastener product.
Figure 22:
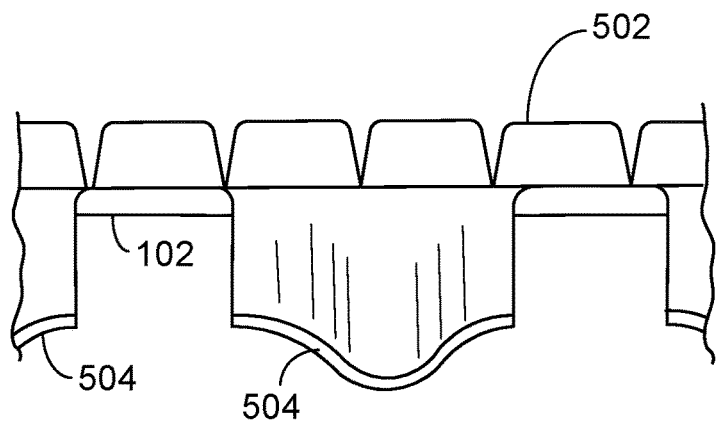
Figure 23:
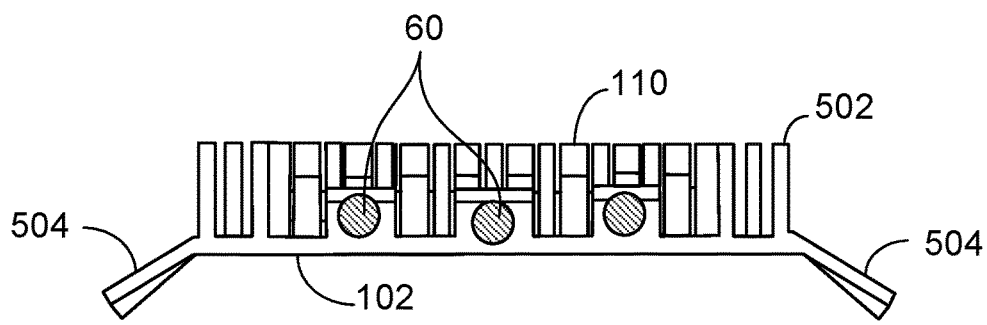

FIGS. 21-23 illustrate another example of a fastener product 500 with non-continuous (segmented) angled wings. Fastener strip 500 features an array of fastening elements 110 disposed between two sets of staggered, segmented walls 502, all extending from a molded resin base 102. This particular example shows three segmented walls on either side of the array, but other arrangements are contemplated. The segmented walls define a tortuous path between gaps, slowing and eventually stalling a flow of foam to help avoid flooding the fastener elements in the molding process. Details of various arrangements of segmented walls and their function can be found in U.S. Pat. No. 8,795,564, the contents of which are incorporated herein in their entirety.

The castellated or segmented wings of product 500 differ from those shown in U.S. Pat. No. 8,795,564 in that they extend from either edge of base 102 extend at an angle toward the back side of the product, as with some of the different wings discussed above. The constant thickness wing segments each also features at least one undulation at its outer edge, such that even were the wing segments to lie against a flat surface portions of each wing segment would be spaced from the surface to form a small gap. Three magnetically attractable wires or cords 60 are embedded in the product and provide magnetic attraction to a mold magnet.

The fastening products described above may be used in a variety of fastening applications. For example, in addition to conventional foam molding applications, the arrangements of the fastening elements and walls can also be employed on a rigid fastening surface, such as injection molded fastening products. The following description provides details of an example application of a fastening product having the types of configurations discussed above.

Figure 24A:
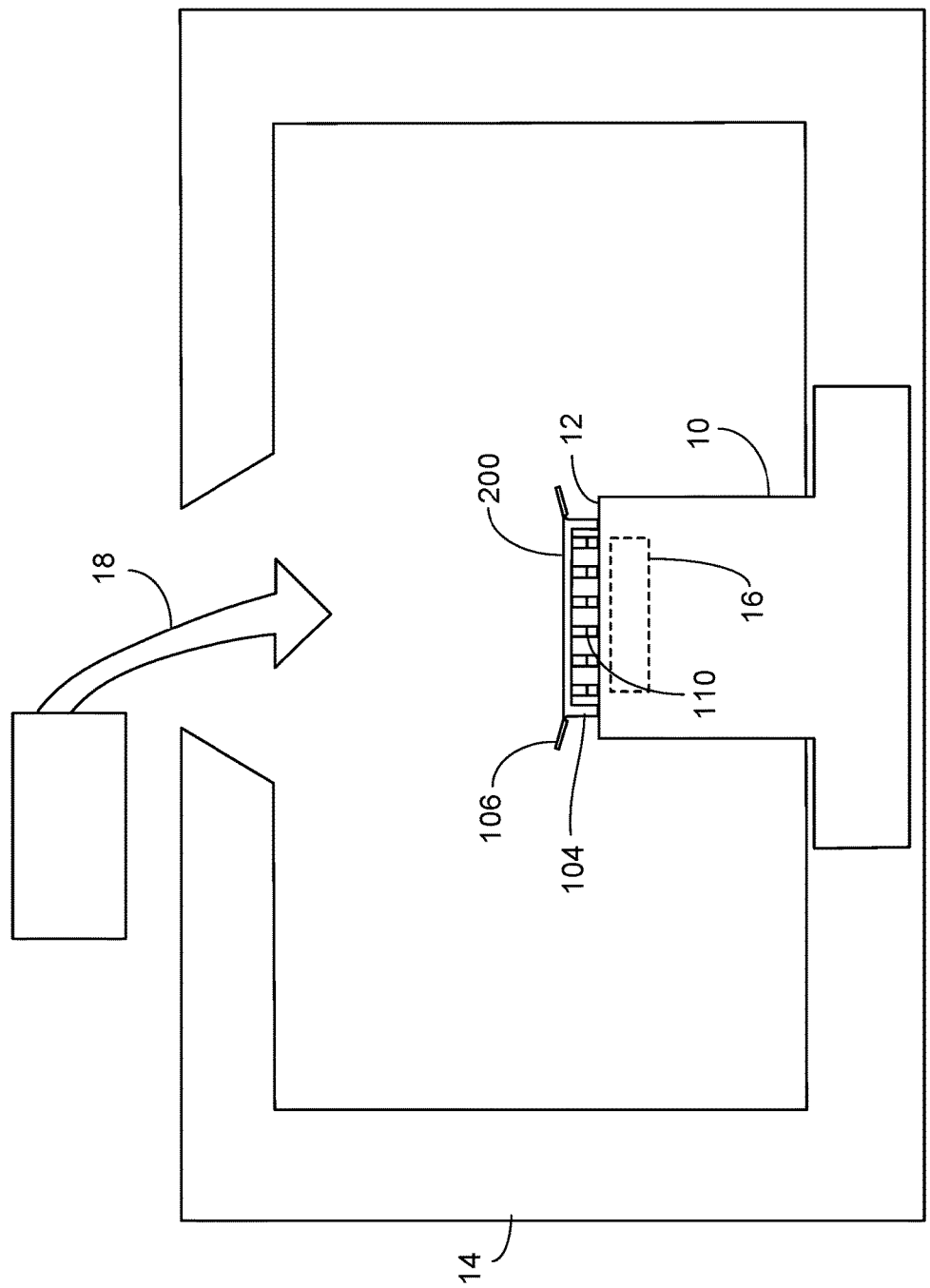
FIGS. 24A-24C schematically and sequentially illustrate a process for forming a molded foam article with a fastening product embedded in one surface of the article.

As shown in FIG. 24A, fastener product 200 is placed on a flat surface 12 of a mold pedestal 10. Mold pedestal 10 is disposed in the interior space of a mold cavity 14. Fastener elements 110 of the product face the mold pedestal surface. As described above, the fastener elements are arranged on the surface of the supporting base in an array between barrier walls 104. The positioning of a fastener product 100 as in FIGS. 1-4 would be similar, but with the foam strips compressed against the surface 12 of the pedestal outboard of the barrier walls 104. At rest, the corrugated wings 106 of the fastener strip extend away from the pedestal surface. The magnetically attractable fastener strip 200 is held against flat surface 12 by a magnet 16 embedded in the pedestal. Magnetic attraction may be due to magnetically attractable resin forming all or part of the fastener product, or may be due to some other magnetically attractable material (e.g., a metal shim, wire or mesh that is secured to or embedded in the base of the product).

Figure 24B:
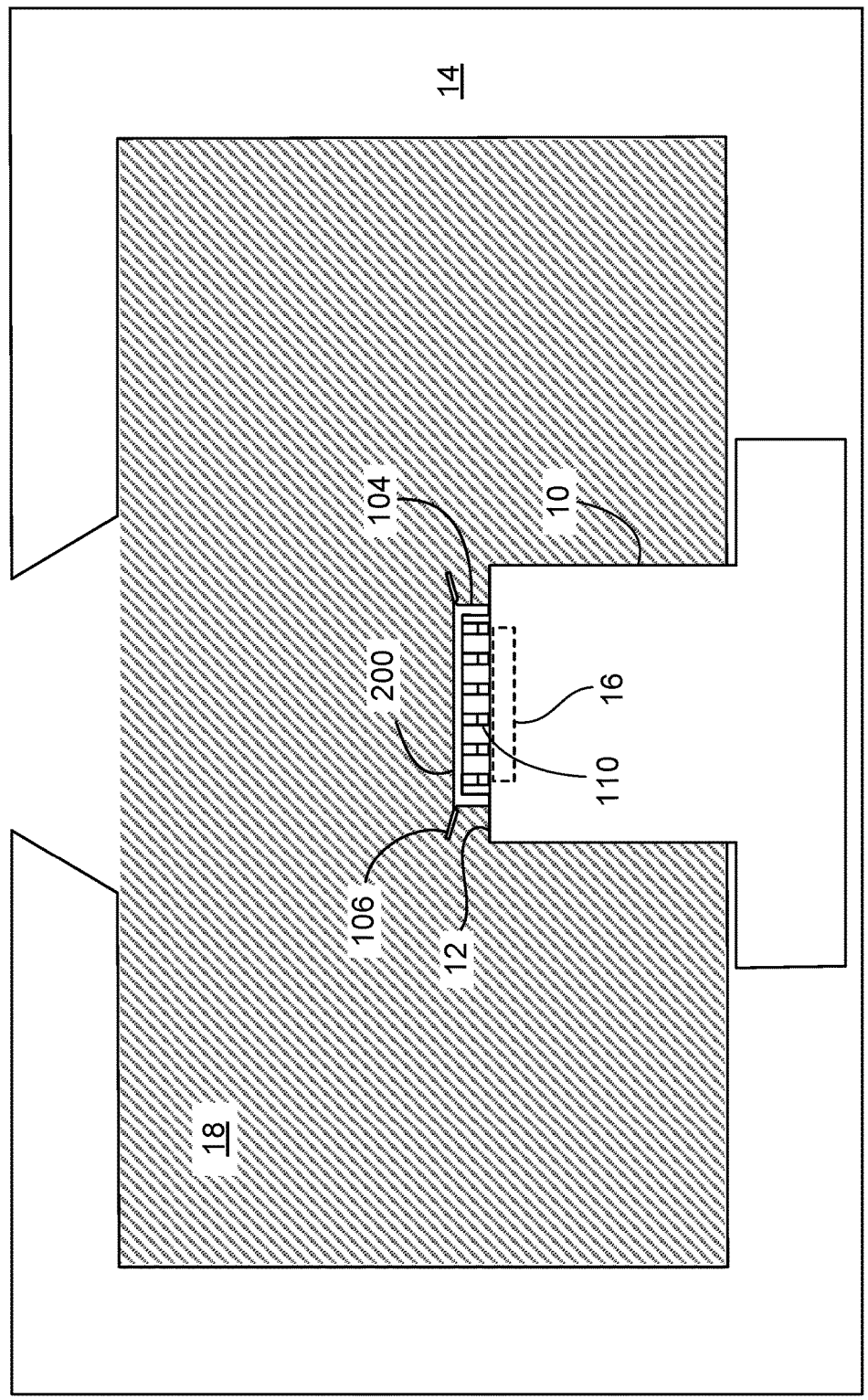

Liquid foam resin 18 is introduced into the mold cavity 14. Liquid foam 68 may constitute a single component, or there may be multiple components that are mixed as they are introduced into the mold cavity, or before. In some implementations, polymeric foams (e.g., polyurethane foam, latex foam, and the like) are used. As shown in FIG. 24B, the liquid foam expands to fill the mold cavity. In some examples, the mold cavity can include a number of vents (not shown) to allow gas displaced by the expanding foam to exit the mold cavity. Suitable venting arrangements for the mold cavity are disclosed in U.S. Pat. Nos. 5,587,183 and 7,878,785, the entire contents of which are hereby incorporated by reference.

As the liquid foam fills the mold cavity, the foam encompasses the angled wings of the strip, which become embedded in the cured foam. The barrier walls and end gaskets effectively seal against the flat pedestal surface. Accordingly, the flowing foam is inhibited from flooding the fastener elements. The molding of foam about the fastener product of FIGS. 1-4 is similar, but the liquid foam contacts the foam strips and end gaskets of the product, which are held compressed against the pedestal surface, and partially penetrates into the open cells of the foam.

Figure 24C:
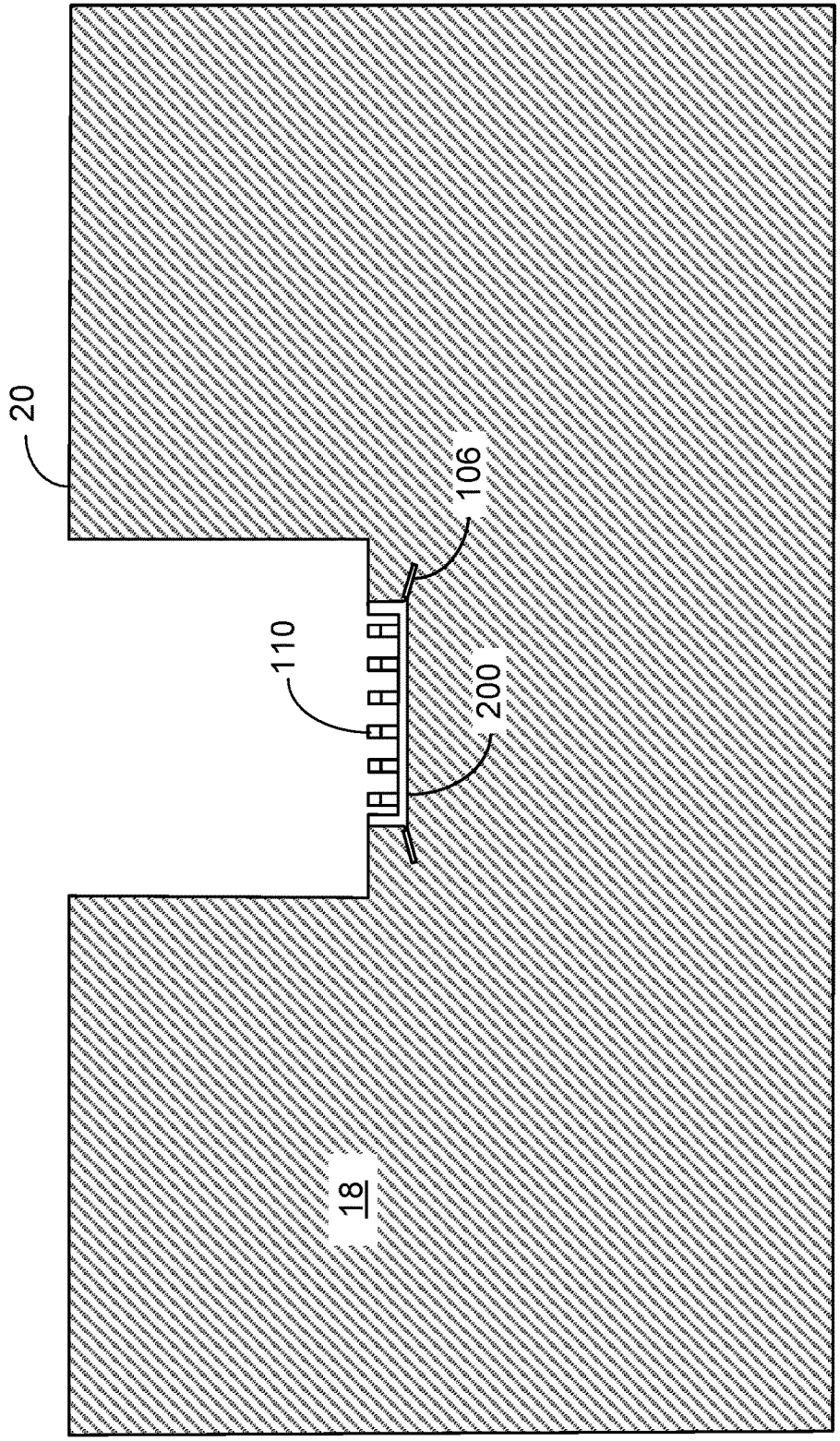

Referring to FIG. 24C, a molded foam article 20, as removed from the mold cavity, has fastening product 200 embedded in a trench defined by the mold pedestal. The perimeter of the fastener product is surrounded by foam. Foam also surrounds and bonds to the edge wings of the fastener strip, anchoring the fastening product to the foam article 20. The barrier walls of the fastening product form flow barriers to inhibit, if not prevent, foam from contacting the interior fastening elements. As a result, the fastener elements 110 remain exposed and functional to releasably engage with fibers of a mating component (not shown) to form a hook-and-loop fastening.

Other appropriate molding techniques and apparatus can be used to form a molded article with an incorporated fastener product. For instance, in some examples, the fastening product can be placed in a trench, as discussed above with respect to FIG. 16.

Figure 25:
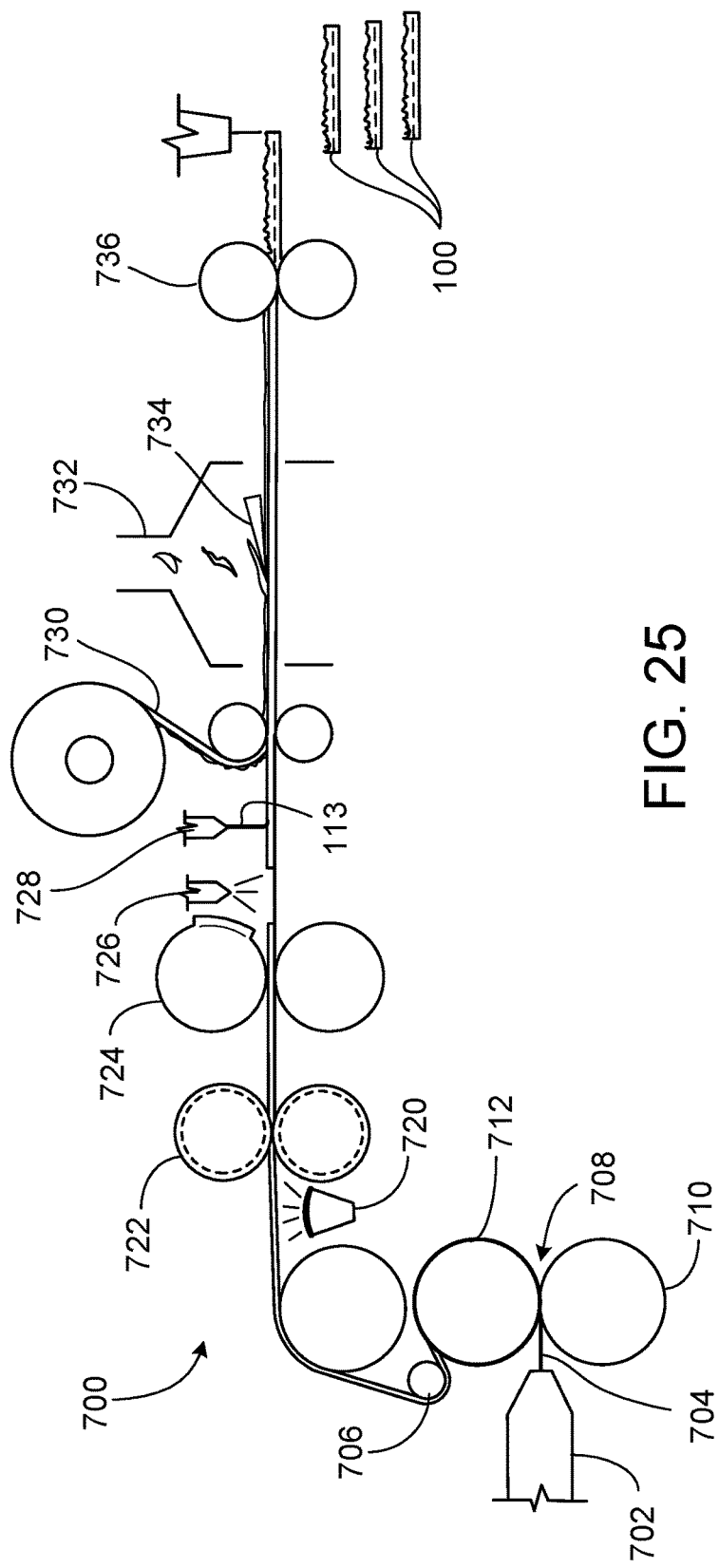
FIG. 25 schematically represents an apparatus and method for forming the fastening product of FIG. 1.

The fastener products disclosed herein can be formed as flexible, continuous strips or sheets of material in a continuous roll molding process. Referring to FIG. 25, manufacturing apparatus 700 has an extruder barrel 702 that melts and forces a molten resin 704 through a die and into a nip 708 between a pressure roller 710 and a cavity roller 712. Cavity roller 712 has cavities defined about its perimeter that are shaped to form the fastener elements (or at least, fastener element preforms) of the product, and other cavities that are configured to form the walls of the product, as the base substrate is formed on the outer surface of the cavity roller. Pressure in the nip forces the molten resin into the various cavities, leaving some resin remaining on the cavity roller surface to form the product base and wings. The resin travels around the cavity roller, which is chilled to promote resin solidification, and the solidified product is then stripped from the cavity roller by pulling the solidified fastener elements and walls from their respective cavities and passing the formed but pliable strip about a stripping roller 706. In many cases the cavity roller will be of a diameter of between 30 and 50 centimeters, and the fastener elements and walls will be less than 1.5 millimeter in height (as described above), to give a sense of perspective.

After the continuous length of fastening material is formed, it is passed over an infrared heating lamp 720, which softens at least the portions of the strip to become the wings, and then passes directly into a crimping station in which pressure between two nested and counter-rotating crimping rollers 722 that apply rolling pressure to emboss or otherwise impress the corrugation pattern into the portions of the product that will become the wings. The crimped product next passes through an end-formation station where a sonic horn (either a reciprocating horn or a rotary horn 724 as shown) obliterates the standing walls and fastener elements, such as by causing the resin of the walls and fastener elements to flow downward and become a part of the base, in discrete regions that will become the end regions of the final product. One nozzle 726 then intermittently sprays an adhesive only on the regions acted upon by the sonic horn, and another nozzle 728 continuously lays beads of hot melt adhesive onto the corrugated portions of the product that will become the wings. Once the adhesives have been applied, a continuous layer of open cell foam 730 is laid onto the product and pressed onto the corrugated and end regions. The composite product next moves into a cutting station 732, where the non-adhered portions of the foam strip are removed with a knife 734, leaving the fastener element arrays exposed and bounded by foam extending along both longitudinal edges of the strip and by foam overlaying the sonically obliterated regions.

The continuous strip next moves to a bending/slitting station, where appropriately shaped rollers 736 plastically bend the wing regions of the strip toward the back side, out of the plane of the base of the strip. The process up to this point may be configured to form a double wide strip with two fastener element arrays and sets of barrier walls, joined by a middle region that is split at the bending/slitting station to separate the strip into two widths. The bent strip is then severed into lengths by slicing the strip midway through each sonically processed end region, producing discrete fastener products 100 of the form shown in FIGS. 1-4.

The products described herein in which the base is formed of a material comprising a magnetically attractable substance, such as an iron or magnetite powder, dispersed throughout a synthetic resin as a nanosuspension or reinforced nanocomposite material, such as fastener product 100 of FIGS. 1-4, fastener product 200 of FIGS. 8 and 9, and fastener product 300 of FIGS. 10-12, can be advantageously configured for improved foam retention strength. We have found that foam nucleating and curing against such resins can form weak spots near the fastener product, resulting in the foam failing when an attached loop material is detached for adjustment during installation, for example. In such cases, the foam may adhere well to the fastener product, but fail just behind the adhered layer of foam cells. Without being bound to any particular theory, we believe that such foam failures may be caused or exacerbated by the rate of cooling of the foam against the back of the magnetically attractable fastener product base.

To help avoid such failures, the portion of the fastener product forming the substrate from which the fastener elements and other related projections extend (i.e., the base 102 of the products described above), should have a specific areal heat capacity, at 50 degrees C., of between about 15 and 65 milli-Joules per square centimeter degree C. This property is determined without regard to fastener elements or walls or other projections extending from the base, and without regard to any selvedges or wings of thinner cross-section than the base. It should be calculated to include any substance or layer provided on the back side of the resin base for contact with the foaming resin, as well as the material containing the magnetically attractable substance. It should also be calculated over a contiguous area of at least two square centimeters, or more if required to account for any repeating patterns of thickness variation. For example, to calculate this parameter for a fastener product having a base of a substance having a specific heat capacity of 1.52 Joules per gram degree C. and a density of 1.44 grams per cubic centimeter, and a nominal thickness of 0.25 mm, the specific areal heat capacity would be 54.7 milli-Joules per square centimeter degree C.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A male touch fastener strip having a front fastening face and a rear face, the strip comprising:
   an elongated base;
   a field of exposed male fastener elements each having a stem extending from the base on the front fastening face of the strip; and
   a pair of wings, each wing extending from a respective longitudinal edge of the base outboard of the field of fastener elements, and having a rear surface forming a portion of the rear face of the strip; wherein each wing defines discrete corrugations extending in a series along the fastener strip and forming corresponding undulations on its rear surface and along a corresponding longitudinal edge region of the fastener strip,
   the wings extending along opposite sides of a non-undulating portion of the rear face.

2. The touch fastener strip of claim 1, wherein the corrugations feature a saw tooth profile at outboard edges of the wings.

3. The touch fastener strip of claim 1, wherein each wing carries a respective strip of foam adhered to the wing on a same side of the fastener strip as the fastener elements.

4. The touch fastener strip of claim 3, wherein the strips of foam overlay the corrugations.

5. The touch fastener strip of claim 3, wherein the fastener strip has longitudinal end regions in which the front fastening face of the strip is covered by foam forming, in cooperation with the strips of foam, an end barrier of the fastener strip.

6. The touch fastener strip of claim 1, wherein at least a portion of each undulation extends at least partially rearward of the base.

7. The touch fastener strip of claim 1, wherein the series of the corrugations comprises a frequency of between 4 and 20 corrugation cycles per inch along the fastener strip.

8. The touch fastener strip of claim 1, wherein the wings are each angled, in an unloaded state, toward the rear face of the strip.

9. The touch fastener strip of claim 8, wherein the wings each form a midpoint angle of between about 5 and 80 degrees with respect to the base.

10. The touch fastener strip of claim 1, wherein the corrugations define a corrugation amplitude, at outer edges of the wings, of at least twice a nominal edge thickness of the wings.

11. The touch fastener strip of claim 1, wherein the base is of a material comprising a magnetically attractable substance dispersed throughout a synthetic resin.

12. The touch fastener strip of claim 11, wherein the magnetically attractable substance comprises between about 30 and 40 percent of the material, by weight.

13. The touch fastener strip of claim 11, wherein the wings are formed of the material, the wings and base together forming a contiguous mass of the synthetic resin.

14. The touch fastener strip of claim 1, further comprising longitudinal walls rising from the base on either side of the field of male fastener elements and inboard of the wings.

15. A male touch fastener strip having a front fastening face and a rear face, the strip comprising:
   an elongated base;
   a field of exposed male fastener elements each having a stem extending from the base on the front fastening face of the strip; and
   a pair of wings, each wing extending from a respective longitudinal edge of the base outboard of the field of fastener elements, and having a rear surface forming a portion of the rear face of the strip;
   wherein each wing carries a respective strip of foam adhered to the wing on a same side of the fastener strip as the fastener elements; and
   wherein each wing defines discrete corrugations extending in a series along the fastener strip and forming corresponding undulations on its rear surface and along a corresponding longitudinal edge region of the fastener strip.

16. The touch fastener strip of claim 15, wherein the strips of foam overlay the corrugations.

17. The touch fastener strip of claim 15, wherein the fastener strip has longitudinal end regions in which the front fastening face of the strip is covered by foam forming, in cooperation with the strips of foam, an end barrier of the fastener strip.

18. A male touch fastener strip having a front fastening face and a rear face, the strip comprising:
   an elongated base;
   a field of exposed male fastener elements each having a stem extending from the base on the front fastening face of the strip; and
   a pair of wings, each wing extending from a respective longitudinal edge of the base outboard of the field of fastener elements, and having a rear surface forming a portion of the rear face of the strip; wherein each wing defines discrete corrugations extending in a series along the fastener strip and forming corresponding undulations on its rear surface and along a corresponding longitudinal edge region of the fastener strip; and
   wherein the wings are each angled, in an unloaded state, toward the rear face of the strip.

* * * * *